United States Patent
Kim et al.

(10) Patent No.: US 11,927,992 B2
(45) Date of Patent: Mar. 12, 2024

(54) ELECTRONIC DEVICE FOR DISCHARGING LIQUID USING SOUND HAVING ADJUSTED CENTER FREQUENCY AND SOUND PRESSURE, AND METHOD THEREFOR

(71) Applicant: Samsung Electronics Co., Ltd., Gyeonggi-do (KR)

(72) Inventors: Hongki Kim, Gyeonggi-do (KR); Jin Kim, Gyeonggi-do (KR); Youngbae Park, Gyeonggi-do (KR); Changshik Yoon, Gyeonggi-do (KR); Dongheon Jang, Gyeonggi-do (KR); Junhui Lee, Gyeonggi-do (KR); Sungho Son, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 17/264,915

(22) PCT Filed: Jul. 25, 2019

(86) PCT No.: PCT/KR2019/009283
§ 371 (c)(1),
(2) Date: Feb. 1, 2021

(87) PCT Pub. No.: WO2020/027501
PCT Pub. Date: Feb. 6, 2020

(65) Prior Publication Data
US 2021/0303036 A1     Sep. 30, 2021

(30) Foreign Application Priority Data

Aug. 3, 2018  (KR) ........................ 10-2018-0090993

(51) Int. Cl.
*H04R 1/02*     (2006.01)
*G06F 1/16*     (2006.01)
(Continued)

(52) U.S. Cl.
CPC ............. *G06F 1/1688* (2013.01); *H04R 3/04* (2013.01); *H04R 29/001* (2013.01)

(58) Field of Classification Search
None
See application file for complete search history.

(56) References Cited

U.S. PATENT DOCUMENTS

| | | |
|---|---|---|
| 8,135,149 B2 | 3/2012 | Yoshida et al. |
| 9,226,076 B2 | 12/2015 | Lippert et al. |
| (Continued) | | |

FOREIGN PATENT DOCUMENTS

| | | |
|---|---|---|
| CN | 1925647 A | 3/2007 |
| CN | 105049966 A | 11/2015 |
| (Continued) | | |

OTHER PUBLICATIONS

European Search Report dated Oct. 1, 2021.
(Continued)

*Primary Examiner* — Harry S Hong
(74) *Attorney, Agent, or Firm* — Cha & Reiter, LLC

(57) ABSTRACT

According to various embodiments of the disclosure, an electronic device may include a housing including an acoustic conduit to output a sound, a sound output device disposed at least partially in the housing, and connected with an outside of the electronic device through the acoustic conduit, a memory, and a processor electrically connected with the sound output device and the memory. The processor may determine whether specified information is received in association with an output of the sound output device, output, through the sound output device, a sound including a plurality of frequency bands, based on the specified information, when the specified information is received, and maintain center frequencies of the plurality of frequency bands to be substantially fixed and change, in a specified range, sound
(Continued)

pressures of the plurality of frequency bands, during time that the sound is output.

14 Claims, 20 Drawing Sheets

(51) Int. Cl.
  *G06F 3/0482* (2013.01)
  *H04R 1/08* (2006.01)
  *H04R 3/04* (2006.01)
  *H04R 29/00* (2006.01)

(56) References Cited

U.S. PATENT DOCUMENTS

| | | |
|---|---|---|
| 9,351,068 B2 | 5/2016 | Slupeiks et al. |
| 9,451,354 B2 | 9/2016 | Zadesky et al. |
| 9,949,022 B2 | 4/2018 | Kropf |
| 10,063,977 B2 | 8/2018 | Zadesky et al. |
| 10,168,204 B2 | 1/2019 | Choi et al. |
| 10,425,738 B2 | 9/2019 | Lippert et al. |
| 10,491,993 B2 | 11/2019 | Mori et al. |
| 10,531,586 B2 | 1/2020 | Yoon et al. |
| 10,750,287 B2 | 8/2020 | Lippert et al. |
| 10,791,406 B2 | 9/2020 | Sun |
| 2007/0047747 A1 | 3/2007 | Yoshida et al. |
| 2014/0193018 A1 | 7/2014 | Lim et al. |
| 2014/0369512 A1 | 12/2014 | Slupeiks et al. |
| 2015/0304767 A1 | 10/2015 | Mori et al. |
| 2015/0319534 A1 | 11/2015 | Lippert et al. |
| 2015/0326959 A1 | 11/2015 | Zadesky et al. |
| 2016/0094911 A1 | 3/2016 | Kropf |
| 2016/0116443 A1 | 4/2016 | Choi et al. |
| 2017/0006383 A1 | 1/2017 | Zadesky et al. |
| 2017/0041712 A1 | 2/2017 | Lippert et al. |
| 2018/0074693 A1 | 3/2018 | Jones et al. |
| 2018/0084324 A1 | 3/2018 | Vitt et al. |
| 2018/0206354 A1 | 7/2018 | Yoon et al. |
| 2018/0260094 A1 | 9/2018 | Kim et al. |
| 2019/0387336 A1 | 12/2019 | Sun |
| 2020/0210060 A1 | 7/2020 | Jones et al. |
| 2021/0048943 A1 | 2/2021 | Jones et al. |
| 2021/0250672 A1* | 8/2021 | Han .................. H04R 1/1075 |

FOREIGN PATENT DOCUMENTS

| | | |
|---|---|---|
| CN | 105491182 A | 4/2016 |
| CN | 106534567 A | 3/2017 |
| CN | 106878909 A | 6/2017 |
| JP | 2000-201388 A | 7/2000 |
| KR | 10-2014-0089768 A | 7/2014 |
| KR | 10-2016-0049794 A | 5/2016 |
| KR | 10-2017-0034076 A | 3/2017 |
| KR | 10-2018-0085506 A | 7/2018 |

OTHER PUBLICATIONS

Chinese Search Report dated Oct. 13, 2021.
European Search Report dated Jan. 21, 2022.
Decision of Rejection dated Oct. 11, 2022.
Office Action dated Nov. 3, 2022.
Korean Final Office Action dated Apr. 3, 2023.
Notification of Reexamination dated Aug. 2, 2023.
European Office Action dated Jan. 2, 2024.

* cited by examiner

ELECTRONIC DEVICE FOR DISCHARGING LIQUID USING SOUND HAVING ADJUSTED CENTER FREQUENCY AND SOUND PRESSURE, AND METHOD THEREFOR

CROSS REFERENCE TO RELATED APPLICATIONS

This application is a National Phase Entry of PCT International Application No. PCT/KR2019/009283, which was filed on Jul. 25, 2019, and claims a priority to Korean Patent Application No. 10-2018-0090993, which was filed on Aug. 3, 2018, the contents of which are incorporated herein by reference.

TECHNICAL FIELD

Various embodiments of the disclosure relate to an electronic device for discharging a liquid by using a sound with controlled center frequency and sound pressure.

BACKGROUND ART

Various types of mobile electronic devices, such as smart phones, smart watches, smart bands, or smart glasses are being released. The electronic device may perform various functions of, for example, calling a voice, calling a video, sending a message, reproducing a moving picture, or reproducing music. The electronic device may include a speaker or a receiver which generate sound. The electronic device may include an acoustic conduit (or hole or opening) to output a sound to the outside of a housing. The sound generated from the speaker may be discharged to the outside through the acoustic conduit.

A liquid (e.g., moisture) may be introduced from the outside through the acoustic conduit which is to output a sound, depending on the use environment (e.g., swimming or fishing) of a user. In this case, moisture may be collected in the space formed between the acoustic conduit and a sound output surface of the speaker. The collected moisture may interrupt the output of the sound generated from the sound output surface, thereby causing discomfort to the user, and causing malfunction of the electronic device.

DISCLOSURE

Technical Problem

According to the related art, an electronic device may discharge the liquid by generating heat or a sound or by inducing a user to shake the electronic device. In this case, the water introduced into the electronic device may not be efficiently discharged.

Technical Solution

According to various embodiments of the disclosure, an electronic device may be provided to discharge a liquid, which is introduced into the electronic device, to an outside, by using a sound signal generated based on a plurality of center frequencies fixed.

According to various embodiments of the disclosure, an electronic device includes a housing including an acoustic conduit to output a sound, a sound output device disposed at least partially in the housing, and connected with an outside of the electronic device through the acoustic conduit, a memory, and a processor electrically connected with the sound output device and the memory. The processor may determine whether specified information is received in association with an output of the sound output device, output, through the sound output device, a sound including a plurality of frequency bands, based on the specified information, when the specified information is received, and maintain center frequencies of the plurality of frequency bands to be substantially fixed and change, in a specified range, sound pressures of the plurality of frequency bands, during time that the sound is output.

Advantageous Effects

According to various embodiments of the disclosure, the electronic device may efficiently discharge a liquid by changing a sound pressure of a plurality of frequency bands having fixed center frequencies which.

According to various embodiments of the disclosure, the electronic device naturally outputs sounds continuous for time to discharge a liquid introduced into the electronic device, thereby reducing the sense of difference that the user may feel in the procedure of discharging the sound.

According to various embodiments of the disclosure, the electronic device may reduce device malfunction by outputting a sound for discharging the liquid, based on the performance of a sound output device such as a speaker or a receiver.

MODE FOR INVENTION

Figure 1A:
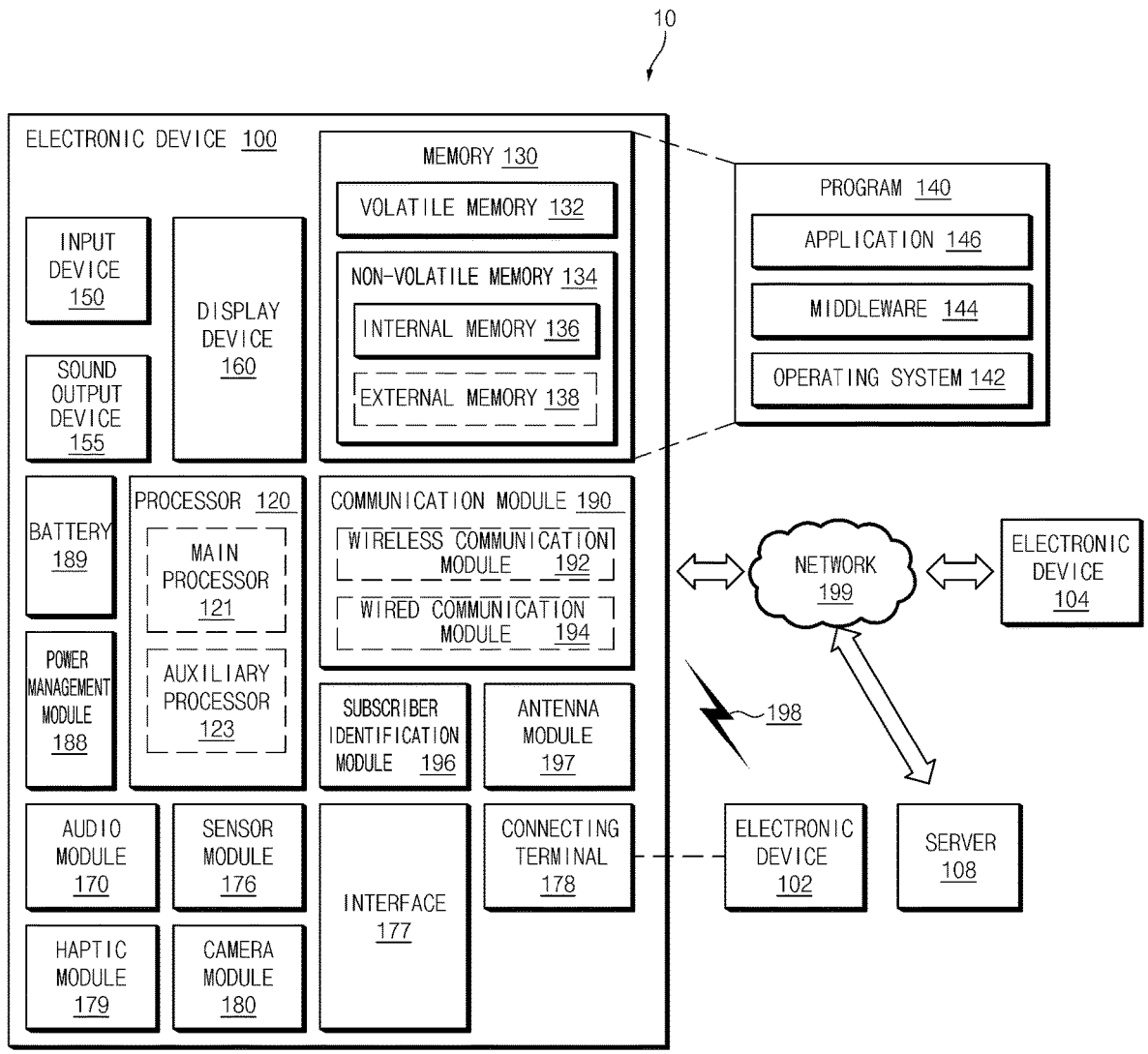
FIG. 1A is a block diagram illustrating an electronic device which discharges an internal foreign matter of a device using a sound having a center frequency and a sound pressure, which are adjusted, according to various embodiments, in a network environment.

Below, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the specification, the expressions "have", "may have", "include" and "comprise", or "may include" and "may comprise" used herein indicate existence of corresponding features (e.g., numeric values, functions, operations, or components such as parts) but do not exclude presence of additional features.

Also, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various components of various embodiments of the present disclosure, but do not limit the elements. For example, "a first user device" and "a second user device" indicate different user devices regardless of the order or priority. For example, without departing the scope of the present disclosure, a first complement may be referred to as a second component, and similarly, a second complement may be referred to as a first complement.

It will be understood that when a complement (e.g., a first complement) is referred to as being "(operatively or communicatively) coupled with/to" or "connected to" another complement (e.g., a second complement), it can be directly coupled with/to or connected to the other complement or an intervening complement (e.g., a third complement) may be present. In contrast, when a complement (e.g., a first complement) is referred to as being "directly coupled with/to" or "directly connected to" another complement (e.g., a second complement), it should be understood that there are no intervening complement (e.g., a third complement).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the specification are used to describe specified embodiments of the present disclosure and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

A wearable device according to various embodiments of the present disclosure may include at least one of an accessory type of device (e.g., a timepiece, a ring, a bracelet, an anklet, a necklace, glasses, a contact lens, or a head-mounted device (HMD)), a one-piece fabric or clothes type of device (e.g., electronic clothes), a body-attached type of device (e.g., a skin pad or a tattoo), or a bio-implantable type of device (e.g., implantable circuit).

Hereinafter, a wearable device according to various embodiments will be described with reference to the accompanying drawings. The term "user" used herein may refer to a person who uses the wearable device or may refer to a device (e.g., an artificial intelligence electronic device) that uses the wearable device.

FIG. 1A is a block diagram illustrating an electronic device 100, which discharges an internal foreign matter of a device using a sound having a center frequency and a sound pressure, which are adjusted, in a network environment 100, according to various embodiments.

Referring to FIG. 1A, the electronic device 100 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 100 may communicate with the electronic device 104 via the server 108. According to an embodiment, the electronic device 100 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 100, or one or more other components may be added in the electronic device 100. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 100 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 100, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 100. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 100, from the outside (e.g., a user) of the electronic device 100. The input device 150 may include, for example, a microphone, a mouse, or a keyboard.

The sound output device 155 may output sound signals to the outside of the electronic device 100. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

According to various embodiments, the electronic device 100 may include an acoustic conduit (or an opening or a hole) for outputting sound in an area adjacent to the sound output surface of the sound output device 155. A liquid (e.g., moisture) may be introduced from the outside through the acoustic conduit which is to output a sound, depending on the use environment (e.g., swimming or fishing) of a user. In this case, moisture may be collected in the space formed between the acoustic conduit and the sound output surface of the speaker. The collected moisture may interrupt the sound, which is generated from the sound output surface, from being output, thereby causing discomfort to the user, and causing malfunction of the electronic device.

According to various embodiments, the processor 120 may output a liquid discharge sound, in which a plurality of frequency bands are combined, for discharging a liquid (e.g., moisture) introduced into the acoustic conduit. The processor 120 may reduce time taken to discharge a liquid by changing a sound pressure, when the center frequency of each of the plurality of frequency bands is maintained.

The display device 160 may visually provide information to the outside (e.g., the user) of the electronic device 100. The display device 160 may include, for example, a display, a hologram device, or a control circuit for controlling a projector and a corresponding device. According to an embodiment, the display device 160 may include a touch circuitry configured to sense a touch, or a sensor circuitry (e.g., a pressure sensor) configured to measure the strength of force generated by the touch.

The audio module 170 may convert sound to an electrical signal, or reversely, may convert an electrical signal to sound. According to an embodiment, the audio module 170 may obtain sound through the input device 150, or may output sound through the sound output device 155, or through an external electronic device (e.g., the electronic device 102) (e.g., a speaker or a headphone) directly or wirelessly connected with the electronic device 100.

The sensor module 176 may sense an operation state (e.g., power or a temperature) of the electronic device 100 or an external environment state (e.g., a user state), and may generate an electrical signal or a data value corresponding the sensed state. According to an embodiment, the sensor module 176 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 100 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connection terminal 178 may include a connector that may allow the electronic device 100 to be physically connected with an external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal to a mechanical stimulation (e.g., vibration or movement) or an electrical stimulation which the user may perceive through the sense of touch or the sense of movement. According to an embodiment, the haptic module 179 may include, for example, a motor, a piezoelectric sensor, or an electrical stimulation device.

The camera module 180 may photograph a still image and a video. According to an embodiment, the camera module 180 may include one or more lenses, image sensors, image signal processors, or flashes (or electrical flashes).

The power management module 188 may manage the power which is supplied to the electronic device 100. According to an embodiment, the power management module 188 may be implemented, for example, as at least a part of a power management integrated circuit (PMIC).

The battery 189 may power at least one component of the electronic device 100. According to an embodiment, the battery 189 may include, for example, a primary cell not recharged, a secondary cell rechargeable, or a fuel cell.

The communication module 190 may establish a direct (or wired) communication channel or a wireless communication channel between the electronic device 100 and an external electronic device (e.g., the electronic device 102, the electronic device 104, or the server 108) or may perform communication through the established communication channel. The communication module 190 may include one or more communication processors which is operated independently of the processor 120 (e.g., an application processor) and supports direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). A corresponding communication module of such communication modules may communicate with an external electronic device over the first network 198 (e.g., a short range communication network such as Bluetooth, Wi-Fi direct, or infrared data association (IrDA)) or the second network 199 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 192 may verify and authenticate the electronic device 100 within a communication network, such as the first network 198 or the second network 199, by using subscriber information (e.g., international mobile subscriber identity (IMSI)) stored in the subscriber identification module 196.

The antenna module 197 may transmit a signal or a power to the outside (e.g., an external electronic device) or may receive a signal or a power from the outside. According to an embodiment, the antenna module 197 may include one or more antennas, and at least one antenna which is suitable for a communication scheme used in a computer network such as the first network 198 or the second network 199 may be selected, for example, by the communication module 190 from the one or more antennas. The signal or power may be exchanged between the communication module 190 and an external electronic device through the selected at least one antenna or may be received from the external electronic device through the selected at least one antenna and the communication module 190.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 100 and the external electronic device 104 through the server 108 connecting to the second network 199. Each of the electronic devices 102 and 104 may be a device, the kind of which is the same as or different from a kind of the electronic device 100. According to an embodiment, all or a part of operations to be executed in the electronic device 100 may be executed in one or more external devices of the external electronic devices 102, 104, or 108. For example, in the case where the electronic device 100 should perform any function or service automatically or in response to a request from the user or any other device, the electronic device 100 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 100. The electronic device 100 may process received result as it is or additionally, and may provide a result of the processing as at least a part of the response to the request. To this end, for example, a cloud computing, distributed computing, or client-server computing technology may be used.

Figure 1B:
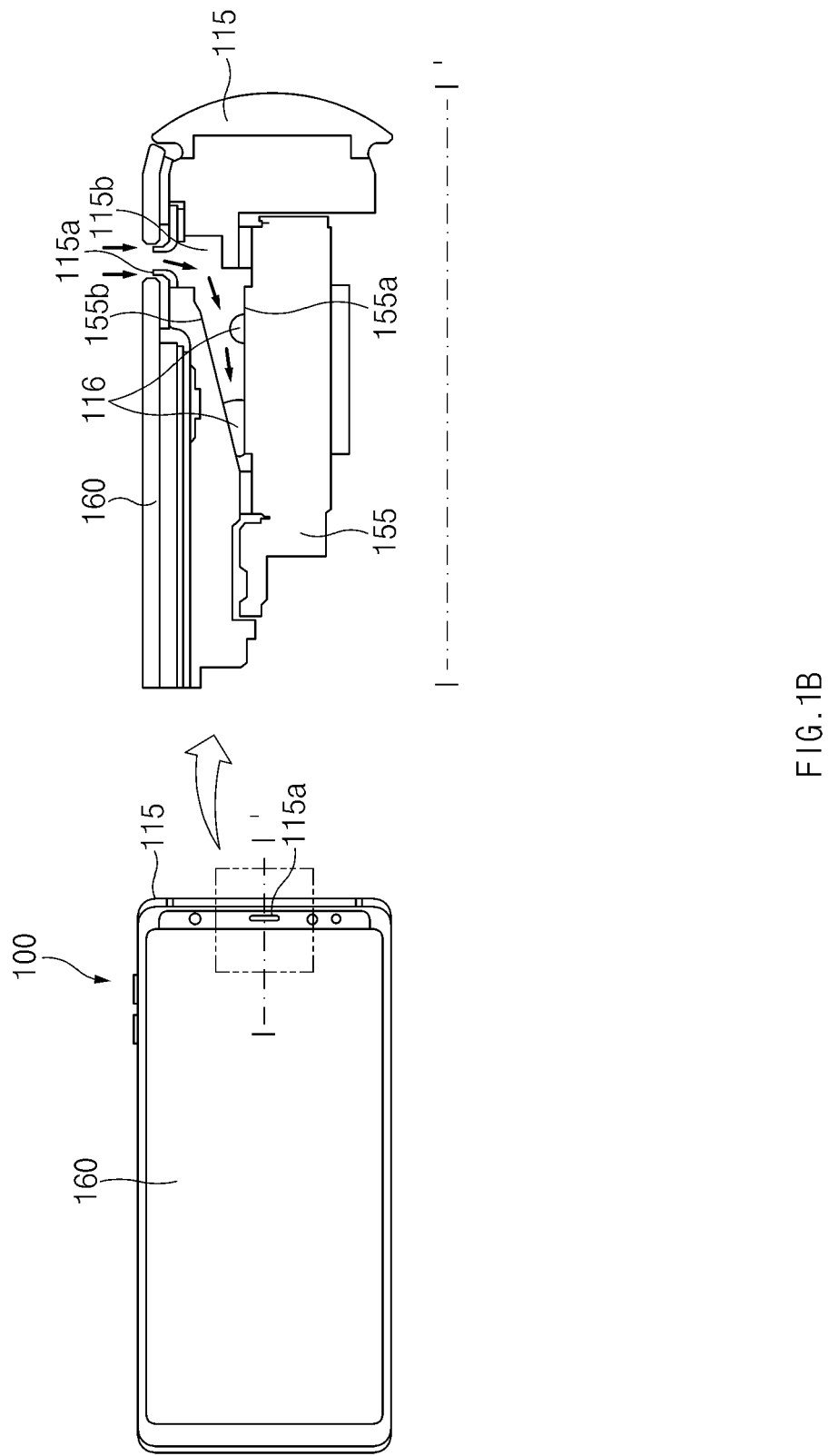
FIG. 1B is a cross-sectional view of an electronic device, according to various embodiments.

FIG. 1B is a cross-sectional view of an electronic device, according to various embodiments. FIG. 1B illustrates a peripheral component of a calling receiver, but the disclosure is not limited thereto.

Referring to FIG. 1, the electronic device 100 may include the display device (or display) 160, and a housing (or main body part) 115.

The display device 160 may be disposed to occupy most part of a front plate (a surface to output content through the display device 160) of the electronic device 100. For another example, the display device 160 may have the form expanded to a side member (e.g., left and right side surfaces) of the electronic device 100.

According to various embodiments, various physical components (e.g., an acoustic conduit 115a, a camera lens, or a sensor window) may be disposed at a peripheral portion of the display device 160. The physical components may be disposed in a bezel area of the peripheral portion of the display device 160 or may be disposed in the form of overlapping a non-active area of the display device 160.

According to various embodiments, the display device 160 may be mounted in the housing 115, and the housing 115 may include various components (e.g., a processor, a communication circuit, a battery, or a substrate) therein to drive the electronic device 100.

According to various embodiments, the electronic device 100 may include the sound output device 155 therein. The sound output device 155 may generate a sound signal by an electrical signal. The sound signal may be discharged to the outside through the acoustic conduit 115a.

According to various embodiments, the sound output device 155 may be disposed in the form of partially overlapping the display device 160. For example, the sound output device 155 may partially overlap an active area of the display device 160, when the electronic device 100 is viewed from above the front plate.

Although FIG. 1B illustrates that the sound output device 155 is a receiver for calling, the disclosure is not limited thereto. For example, the sound output device 155 may be a speaker device implemented separately from the receiver.

According to various embodiments, the housing 115 may include an acoustic conduit (or through hole) 115a. The acoustic conduit 115a may discharge a sound to the outside from the sound output device 155 provided at the inside.

According to various embodiments, the acoustic conduit 115a may be blocked by an additional blocking member (e.g., a mesh net). The blocking member may primarily block a foreign matter (e.g., dust or moisture) introduced into the acoustic conduit 115a.

According to various embodiments, the housing 115 may include a sound output space 115b which communicates with the acoustic conduit 115a and outputs a sound. The sound output space 115b may be a space surrounded by a seating surface 155b which face the sound output device and a sound generating surface 155a. The sound output space 115b may serve as a passage to send a sound signal, which is output from the sound generating surface 155a, to the acoustic conduit 115a.

A liquid (e.g., moisture) 116 introduced from the outside may be filled in at least a portion of the sound output space 115b. When the liquid (e.g., moisture) 116 is filled in the sound output space 115b, the sound signal may be interrupted from being discharged from the sound generating surface 155a. According to various embodiments, when the liquid (e.g., moisture) 116 is filled in the sound output space 115b, the electronic device 100 may output a sound including a plurality of frequency bands through the sound output device 155. The electronic device 100 may maintain center frequencies of a plurality of frequency bands to be substantially fixed and may change, in a specified range, sound pressures of the plurality of frequency bands, during time that the sound is output. The electronic device 100 may discharge the liquid 116 out of the electronic device 100, through the vibration generated by outputting the sound maintaining the center frequencies of the plurality of frequency bands.

Figure 2A:
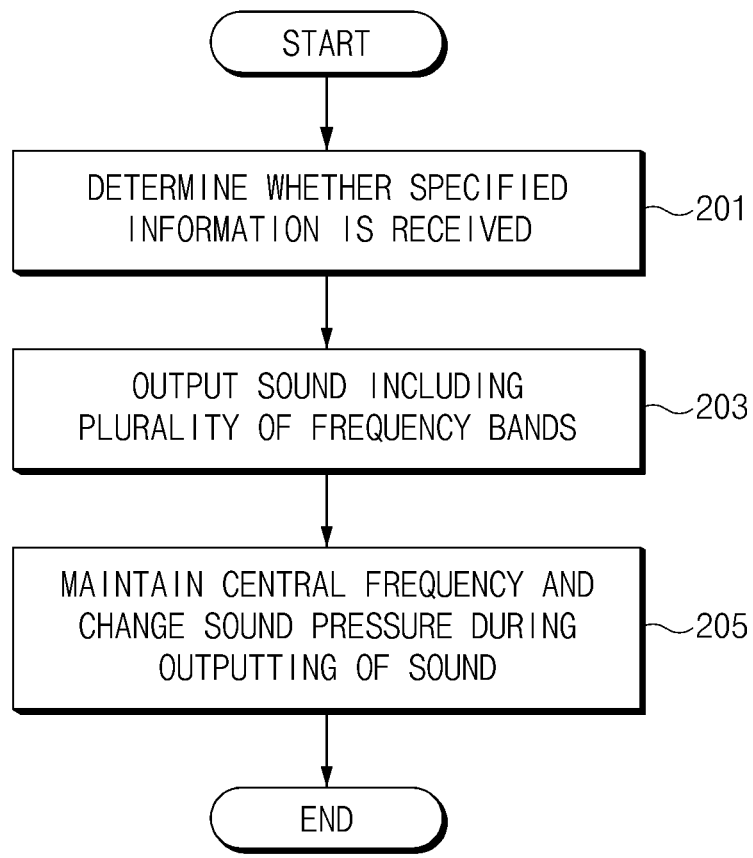
FIGS. 2A and 2B are flowcharts illustrating a method for outputting a sound for discharging a liquid, according to various embodiments.

FIG. 2A is a flowchart illustrating a method for outputting a sound for discharging a liquid, according to various embodiments.

Referring to FIG. 2A, in operation 201, the processor (e.g., the processor 120 in FIG. 1A) of an electronic device (e.g., the electronic device 100 in FIG. 1A or the electronic device 100 in FIG. 1B) may determine whether specified information (or sensing information) is received.

According to an embodiment, the specified information may include information received from a sensing module (or sensor module) to sense that foreign matters (e.g., moisture) are present in the sound output space 115b which is to output a sound. For example, the specified information may be a sound signal collected through a microphone which is to receive a sound output through the speaker.

According to various embodiments, the specified information may be information on a user input to output a sound for discharging a liquid. For example, the specified information may be information selected through a user input generated from an application to discharge a liquid, as the application is executed.

In operation 203, the processor may output, through the sound output device 155, a sound including a plurality of frequency bands, based on the specified information, when the specified information is received. For example, the sound output device 155 may change an electrical signal into vibration in response to control of the processor 120. A sound corresponding to the liquid discharge sound may be output through the vibration, and the liquid introduced into the acoustic conduit 115a may be discharged to the outside.

In operation 205, the processor 120 may maintain the center frequency of each of a plurality of frequency bands to be substantially fixed and may change, in a specified range, the sound pressures of the plurality of frequency bands, during time that the sound is output. The processor 120 may enhance liquid discharge performance by outputting the sound to maintain the center frequencies of each of the plurality of frequency bands to be fixed. According to an embodiment, the processor 120 may reduce the sense of difference felt by a user when the user listens to the sound, by changing, in the specified range, the sound pressures (the intensity of the sound; amplitude) of the plurality of frequency bands over time.

Figure 2B:
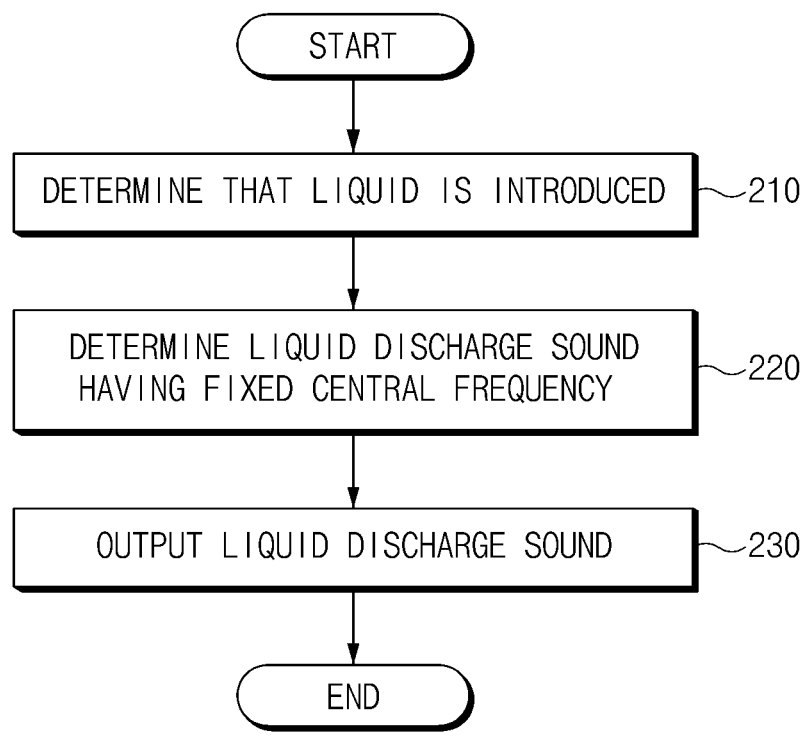

FIG. 2B is a flowchart illustrating a method for outputting a sound for discharging a liquid, according to various embodiments.

Referring to FIG. 2B, the electronic device 100 may include the acoustic conduit 115a (or a hole) to output a sound to the outside of the housing 115. A sound generated from the sound output device 155 may be discharged to the outside through the acoustic conduit 115a.

In operation 210, the processor 120 may determine that a liquid is introduced through the acoustic conduit 115a which is to output a sound. A liquid (e.g., moisture) may be introduced from the outside through the acoustic conduit, which is to output a sound, depending on the use environment (e.g., swimming or fishing) of a user. In this case, the liquid (e.g., moisture) may be collected in the sound output space 115b formed between the acoustic conduit 115a and the sound output surface of the sound output device 155 (e.g., the speaker or the receiver).

According to an embodiment, the processor 120 may automatically determine that the liquid is introduced through the acoustic conduit 115a, when the display device 160 (e.g., display) is released from a water-lock mode.

According to another embodiment, the processor 120 may determine that the liquid is introduced through the acoustic conduit 115a, when a specified application (e.g., an application to generate a sound for discharging a liquid) is executed, and when a specified input of the user is generated.

According to another embodiment, the processor 120 may determine that the liquid is introduced through the acoustic conduit 115a, when a specified sound is output through a speaker, and when the intensity of a sound sensed through the sensor (e.g., microphone) is equal to or less than a specified value.

In operation 220, the processor 120 may determine a sound (hereinafter, a liquid discharge sound) for discharging a liquid introduced through the acoustic conduit 115a. For example, the liquid discharge sound, which is differentiated from a sound obtained by reproducing a moving picture or music in terms of use, may be preset or selected through a user input.

According to an embodiment, the processor 120 may determine the liquid discharge sound in which a plurality of frequency bands, which are separated from each other in a frequency domain, are combined. Each of the plurality of frequency bands may have a center frequency. The center frequency may be a frequency signal, which has the substantially highest sound pressure, among signals included in the frequency band.

According to an embodiment, the center frequency may be maintained without being changed over time. The processor 120 may determine a liquid discharge sound, the sound pressure of which is changed over time, in the state that the center frequencies of the plurality of frequency bands are maintained.

According to various embodiments, the processor 120 may change the bandwidth of each of the plurality of frequency bands constituting the liquid discharge sound, over time. For example, the processor 120 may set the bandwidth of a first frequency band to have the largest value in first time, and may set the bandwidth of a second frequency band to have the largest value in second time. The processor 120 may adjust the bandwidth, by reflecting information on the sensing to a surrounding environment of the electronic device 100, a user input, or the characteristic of the liquid discharge sound.

In operation 230, the processor 120 may output the liquid discharge sound through the sound output device 155 (e.g., the speaker or the receiver). For example, the sound output device 155 may change an electrical signal into vibration in response to control of the processor 120. A sound corresponding to the liquid discharge sound may be output through the vibration, and the liquid introduced into the acoustic conduit 115*a* may be discharged to the outside.

The sound pressure (the intensity of the sound, amplitude) constituting the liquid discharge sound may be changed over time, in the state that the center frequencies of the plurality of frequency bands are maintained. The processor 120 may control a first pass to reproduce music or a moving picture and a second pass to reproduce a liquid discharge sound. The first pass or the second pass may be audio output manners separated from each other in software or hardware.

According to various embodiments, the processor 120 may output the liquid discharge sound, based on information specified to discharge a liquid. For example, the processor 120 may output the liquid discharge sound, based on a gain of, for example, a specified CODEC or an amplifier. For another example, the processor 120 may output the liquid discharge sound at a level that does not exceed a rated voltage of the speaker.

According to various embodiments, the processor 120 may identify the temperature of the sound output device, through a sensor (e.g., a temperature sensor), and output a liquid discharge sound at a specified temperature or less. Accordingly, the sound output device may be prevented from being damaged.

According to various embodiments, a method for outputting a sound, which is performed in the electronic device, may include determining whether specified information is received, starting to output, through the sound output device of the electronic device, a sound including a plurality of frequency bands, based on the specified information, when the specified information is received, and maintaining center frequencies of the plurality of frequency bands to be substantially fixed, during time in which the sound is output, and changing the sound pressures of the plurality of frequency bands in a specified range.

According to various embodiments, each of the center frequencies may be a frequency at a point at which the highest sound pressure is shown in a relevant frequency band of the plurality of frequency bands.

According to various embodiments, the determining of whether specified information is received may include sensing a foreign matter present in the acoustic conduit of the electronic device, through a sensing module of the electronic device, and receiving the specified signal based on a liquid introduced into the acoustic conduit, from the sensing module.

According to various embodiments, the changing of the sound pressures of the plurality of frequency bands in a specified range may include outputting the plurality of frequency bands at first sound pressure, for first time, outputting the plurality of frequency bands at second sound pressure, for second time after the first time, and outputting the plurality of frequency bands at third sound pressure, for third time after the second time.

According to various embodiments, the method for outputting the sound may further include outputting a dummy tone having sound pressure lower than the plurality of frequency bands, between the first time and the second time.

According to various embodiments, the changing of the sound pressure of the plurality of frequency bands in a specified range may include determining an output band of the plurality of frequency bands, based on at least one of the intensity of a voltage used in the sound output device or a gain of an audio circuit to generate the sound.

Figure 3:
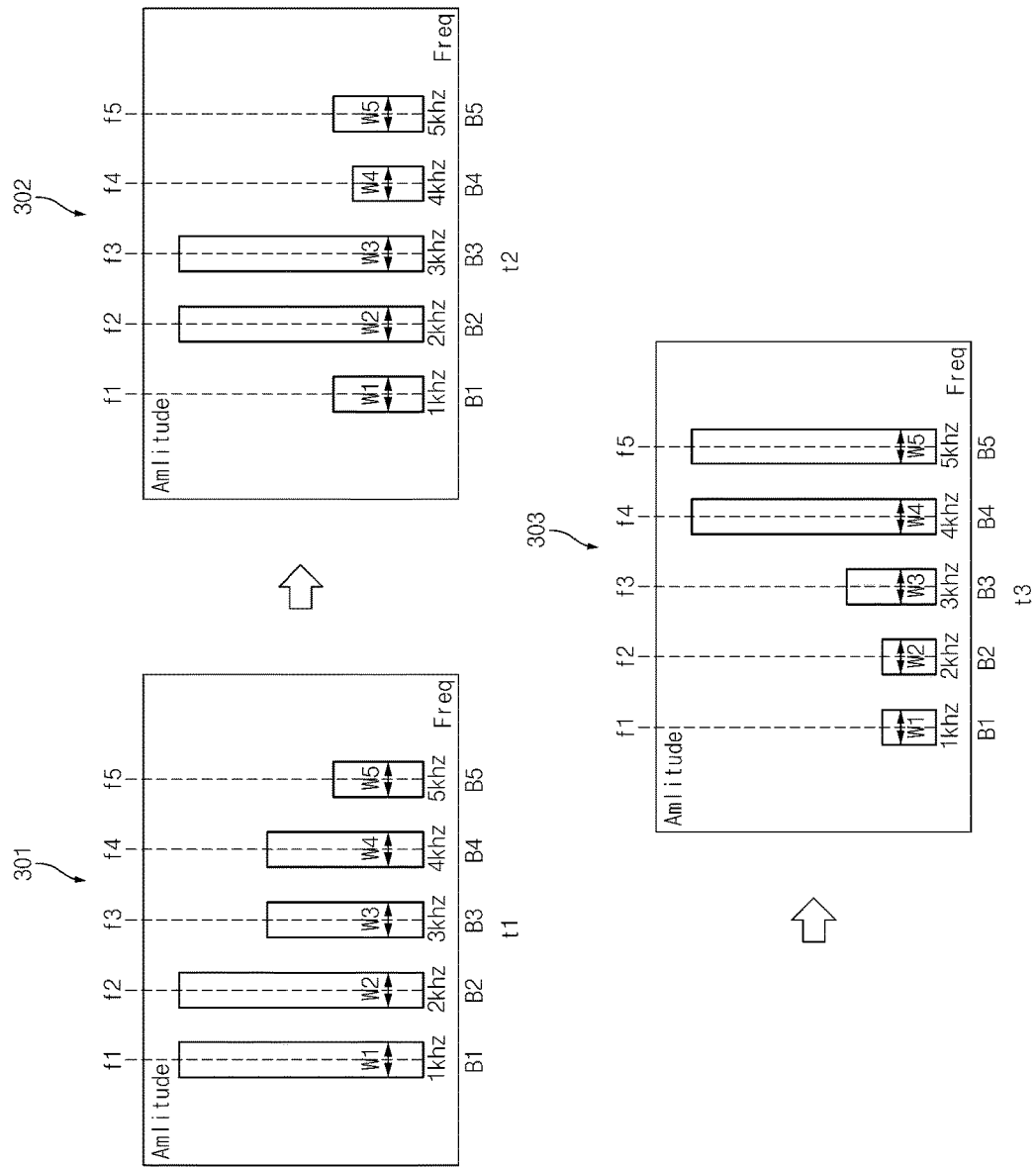
FIG. 3 illustrates a frequency characteristic of a liquid discharge sound, according to various embodiments.

FIG. 3 illustrates a frequency spectrum of a liquid discharge sound, according to various embodiments. Although FIG. 3 illustrates that the liquid discharge sound includes first to fifth frequency bands, the disclosure is not limited thereto.

Referring to FIG. 3, the processor 120 may output liquid discharge sounds 301, 302, and 303, through the sound output device 155 (e.g., the speaker or the receiver). The sound output device 155 may generate vibration corresponding to the liquid discharge sounds 301, 302, and 303. A liquid (e.g., moisture) introduced into the sound output space may be discharged to the outside by the vibration.

The liquid discharge sounds 301, 302, and 303 may include a plurality of frequency bands. Although FIG. 3 illustrates that each of the liquid discharge sounds 301, 302, and 303 includes first to fifth frequency bands B1 to B5, the disclosure is not limited thereto.

The first frequency band B1 may have a first center frequency f1 (e.g., 1 khz) and a first bandwidth W1. The second frequency band B2 may have a second center frequency f2 (e.g., 2 khz) and a second bandwidth W2. The third frequency band B3 may have a third center frequency f3 (e.g., 3 khz) and a third bandwidth W3. The fourth frequency band B4 may have a fourth center frequency f4 (e.g., 4 khz) and a fourth bandwidth W4. The fifth frequency band B5 may have a fifth center frequency f5 (e.g., 5 khz) and a fifth bandwidth W5.

According to an embodiment, while the liquid discharge sounds 301, 302, and 303 are output, the first to fifth center frequencies f1 to f5 may be maintained without being changed over time.

According to an embodiment, the first to fifth bandwidths W1 to W5 may be equal to each other and may not be changed over time.

According to an embodiment, the sound pressures (or sound intensities) of the first to fifth frequency bands B1 to B5 may be changed over time. For example, the first frequency band B1 and the second frequency band B2 may have higher sound pressure, and the third to fifth frequency bands B3 to B5 may have lower sound pressure, for time t1. For example, the second frequency band B2 and the third frequency band B3 may have higher sound pressure, and the first frequency band B1, the fourth frequency band B4, and the fifth frequency band B5 may have lower sound pressure, for time t2. For example, the fourth frequency band B4 and the fifth frequency band B5 may have higher sound pressure, and the first frequency band B1 to the third frequency band B3 may have lower sound pressure, for time t3.

According to an embodiment, the sound pressure of at least one frequency band may be maintained at the reference time. For example, the sound pressure of the second frequency band B2 may be maintained without being changed, for the times t1 and t2.

According to various embodiments, the sound pressures of the liquid discharge sounds 301, 302, and 303 may be sequentially changed based on the frequency values. For example, while time is changed from t1 to t3, the sound pressures of the first and second frequency bands B1 and B2 having lower center frequencies may be gradually decreased, and the fourth and fifth frequency bands B4 and B5 having higher center frequencies may be gradually increased.

According to various embodiments, the sound pressures of the liquid discharge sounds 301, 302, and 303 may be repeatedly changed in a specified period of time.

According to various embodiments, the first to fifth frequency bands B1 to B5 may be different from each other in sound pressure, at the reference time. For example, the first to fifth frequency bands B1 to B5 may have sound pressures set to mutually different values, in the time t1, t2, or t3.

Figure 4:
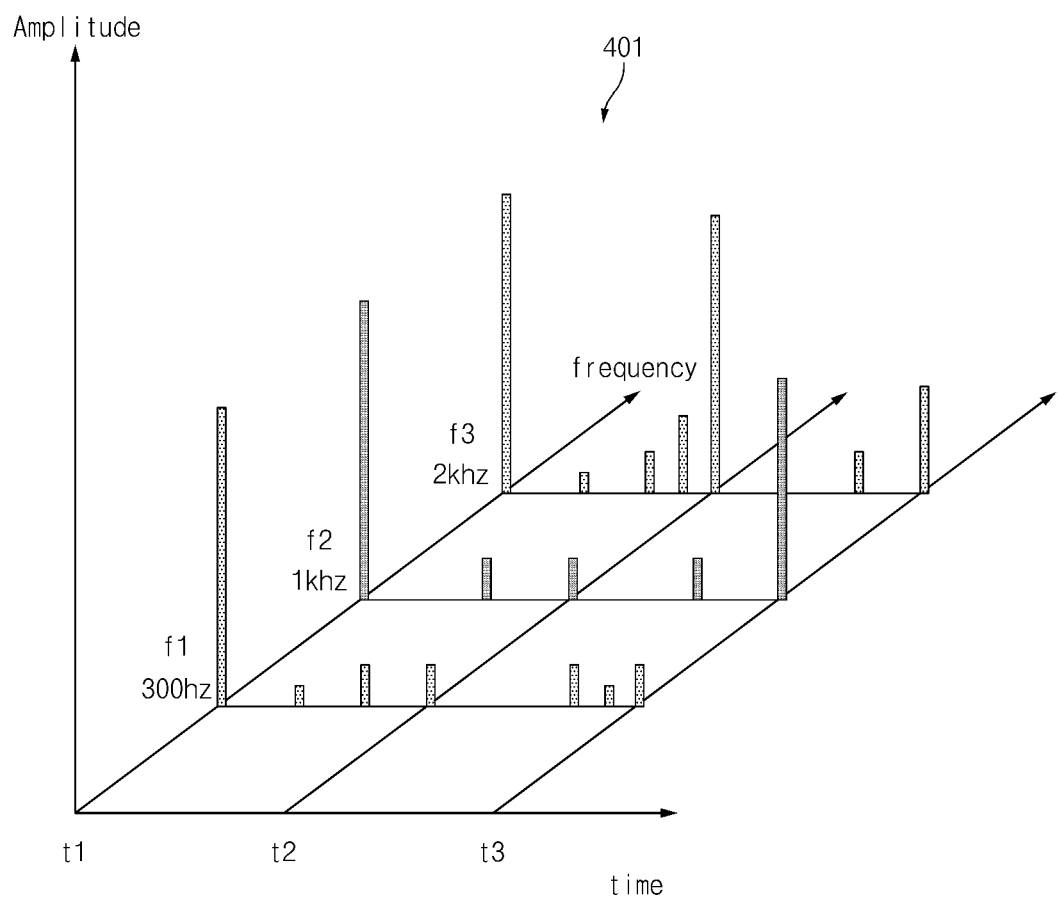
FIG. 4 illustrates the change in sound pressure of the center frequency depending on the change of time and frequency, according to various embodiments.

FIG. 4 illustrates the change in sound pressure of the center frequency depending on the change of time and frequency. FIG. 4 is provided for the illustrated purpose, but the disclosure is not limited thereto.

Referring to FIG. 4, a liquid discharge sound 401 may include a plurality of frequency bands. Although FIG. 4 illustrates that the liquid discharge sound 401 includes a first frequency band to a third frequency band, and that the center frequencies of the frequency band to the third frequency band are a first center frequency f1 to a third center frequency B, the disclosure is not limited thereto. The processor 120 may output the first center frequency f1 to the third center frequency 3 with specified sound pressures, respectively. For example, each of the first center frequency f1 to the third center frequency B may be set with 100 dB.

For time t2, the processor 120 may reduce the sound pressures of the first center frequency f1 and the second center frequency f2 to be specified values or less (e.g., 10 dB or less), and may maintain the sound pressure of the third center frequency B to be a higher value (e.g., 90 dB).

For time t3, the processor 120 may reduce the sound pressures of the first center frequency f1 and the third center frequency 3 to be specified values or less (e.g., 20 dB or less), and may maintain the sound pressure of the second center frequency f2 to be a higher value (e.g., 80 dB).

The first center frequency f1 to the third center frequency f3 may be maintained without being changed, for the time t1 to the time t3. For example, the first center frequency f1 may be maintained to 300 hz, the second center frequency f2 may be maintained to 1 khz, and the third center frequency f3 may be maintained to 2 khz, for the time t1 to the time t3.

According to various embodiments, the first center frequency f1 to the third center frequency f3 may be set to have sound pressures changed within a specified range. For example, the first center frequency f1 to the third center frequency f3 may be set to have the sound pressures changed within 10 dB for the reference time.

According to various embodiments, the first center frequency f1 to the third center frequency f3 may be set to have the sound pressures changed within a specified range from an adjacent center frequency. For example, the first center frequency f1 may be set to have the sound pressure changed within 10 dB from the second center frequency f2.

Figure 5:
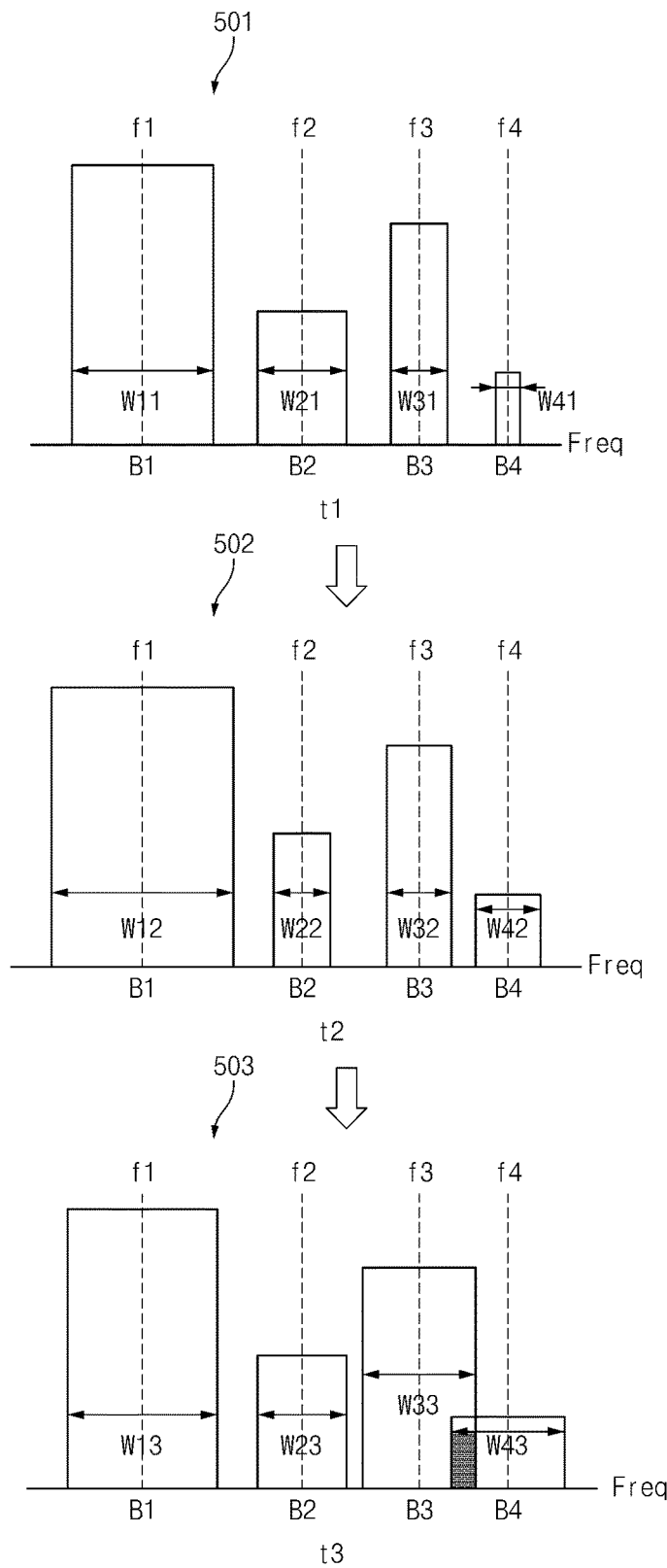
FIG. 5 illustrates the change of bandwidths of frequency bands constituting a liquid discharge sound, according to various embodiments.

FIG. 5 illustrates the change of bandwidths of frequency bands constituting a liquid discharge sound, according to various embodiments.

Referring to FIG. 5, liquid discharge sounds 501, 502, and 503 may include a plurality of frequency bands. Although FIG. 5 illustrates that the liquid discharge sounds 501, 502, and 503 include a first frequency band B1 to a fourth frequency band B4, the disclosure is limited thereto.

The first frequency band B1 may have a first center frequency f1 (e.g., 1 khz) and a first bandwidth W11. The second frequency band B2 may have a second center frequency f2 (e.g., 2 khz) and a second bandwidth W21. The third frequency band B3 may have a third center frequency f3 (e.g., 3 khz) and a third bandwidth W31. The fourth frequency band B4 may have a fourth center frequency f4 (e.g., 4 khz) and a fourth bandwidth W41. According to an embodiment, bandwidths of the first frequency band B1 to the fourth frequency band B4 may be set to prevent the first frequency band B1 to the fourth frequency band B4 from overlapping each other.

According to an embodiment, at least some of the first bandwidth W11 to the fourth bandwidth W41 may have mutually different values. For example, the first bandwidth W11 may be set to 800 hz, the second bandwidth W21 may be set to 600 hz, the third bandwidth W31 may be set to 300 hz, and the fourth bandwidth W41 may be set to 50 hz.

According to various embodiments, the first bandwidth to the fourth bandwidth W11 to W41 may be varied over time. For example, the first bandwidth W11, the third bandwidth W31, and the fourth bandwidth W41 are expanded to the first bandwidth W12 and the third bandwidth W32, and the fourth bandwidth W42, respectively, while the second bandwidth W21 is reduced to the second bandwidth W22, between time t1 and time t2.

For example, the second bandwidth W22, the third bandwidth W32, and the fourth bandwidth W42 are expanded to the second bandwidth W23 and the third bandwidth W33, and the fourth bandwidth W43, respectively, while the first bandwidth W12 is reduced to the first bandwidth W13, between time t2 and time t3.

According to an embodiment, at least some of the first bandwidth W11 to the fourth bandwidth W41 may overlap each other. For example, the third bandwidth W31 and the fourth bandwidth W41 may be expanded to partially overlap each other for time t3. In the overlap section of bandwidths, sounds of the third frequency band B3 and the fourth frequency band B4 may overlap each other, so the sound pressure may be stronger.

Figure 6A:
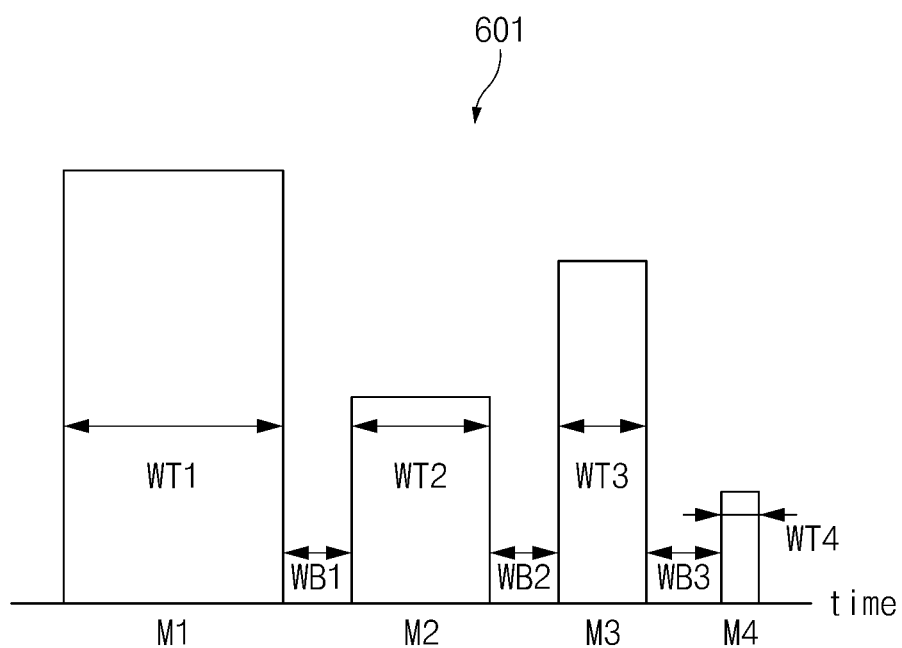
FIG. 6A illustrates the change of a liquid discharge sound in a time domain, according to various embodiments.

FIG. 6A illustrates the change of a liquid discharge sound in a time domain, according to various embodiments.

Referring to FIG. 6A, the processor 120 may output a liquid discharge sound 601, through the sound output device 155 (e.g., the speaker or the receiver). The sound output device 155 may generate vibration corresponding to the liquid discharge sound 601. A liquid (e.g., moisture) introduced into a sound output space may be discharged to the outside by the vibration.

The liquid discharge sound 601 may include a plurality of multi-frequency signals. Although FIG. 6A illustrates that the liquid discharge sound 601 includes a first multi-frequency signal M1 to a fourth multi-frequency signal M4, the disclosure is not limited thereto. The first multi-frequency signal M1 to the fourth multi-frequency signal M4 may include a plurality of frequency bands having fixed center frequencies. At least some of the first multi-frequency signal M1 to the fourth multi-frequency signal M4 may have mutually different sound pressures.

The first multi-frequency signal M1 may have a first duration WT1. The second multi-frequency signal M2 may have a second duration WT2. The third multi-frequency signal M3 may have a third duration WT3. The fourth multi-frequency signal M4 may have a fourth duration WT4. According to an embodiment, the first duration WT1 to the fourth duration WT4 may be set to mutually different values.

A first time interval WB1 may be maintained between the first multi-frequency signal M1 and the second multi-frequency signal M2. A second time interval WB2 may be maintained between the second multi-frequency signal M2 and the third multi-frequency signal M3. A third time interval WB3 may be maintained between the third multi-frequency signal M3 and the fourth multi-frequency signal M4. According to an embodiment, the first time interval WB1 to the third time interval WB3 may be set to be equal values.

According to an embodiment, the processor 120 may output the liquid discharge sound 601 having the first multi-frequency signal M1 to the fourth multi-frequency signal M4 which are repeated in a specified period of time.

According to an embodiment, the first multi-frequency signal M1 to the fourth multi-frequency signal M4 may be varied in total energy depending on the durations or the intensities of the sound pressures. As the duration or the intensity of the sound pressure is increased, the energy of each multi-frequency signal may be increased.

Figure 6B:
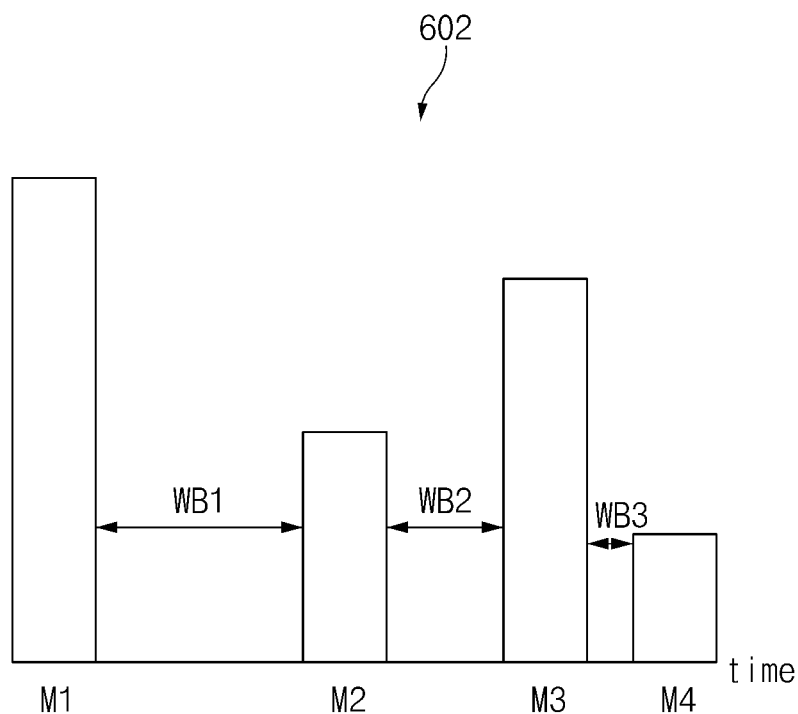
FIG. 6B illustrates the change of a time interval between multi-frequency signals in a time domain, according to various embodiments.

FIG. 6B illustrates the change of a time interval between multi-frequency signals in a time domain, according to various embodiments.

Referring to FIG. 6B, a liquid discharge sound 602 may include a plurality of multi-frequency signals. Although FIG. 6B illustrates that the liquid discharge sound 602 includes a first multi-frequency signal M1 to a fourth multi-frequency signal M4, the disclosure is not limited thereto. According to an embodiment, the first multi-frequency signal to the fourth multi-frequency signal M1 to M4 may have equal durations.

According to an embodiment, the first time interval WB1 to the third time interval WB3 among the first multi-frequency signal M1 to the fourth multi-frequency signal M4 may be set to mutually different values. For example, the time intervals WB1 to WB3 among the first to fourth multi-frequency signals M1 to M4 may be gradually decreased (the time interval WB1>the time interval WB2>the time interval WB3).

Figure 7:
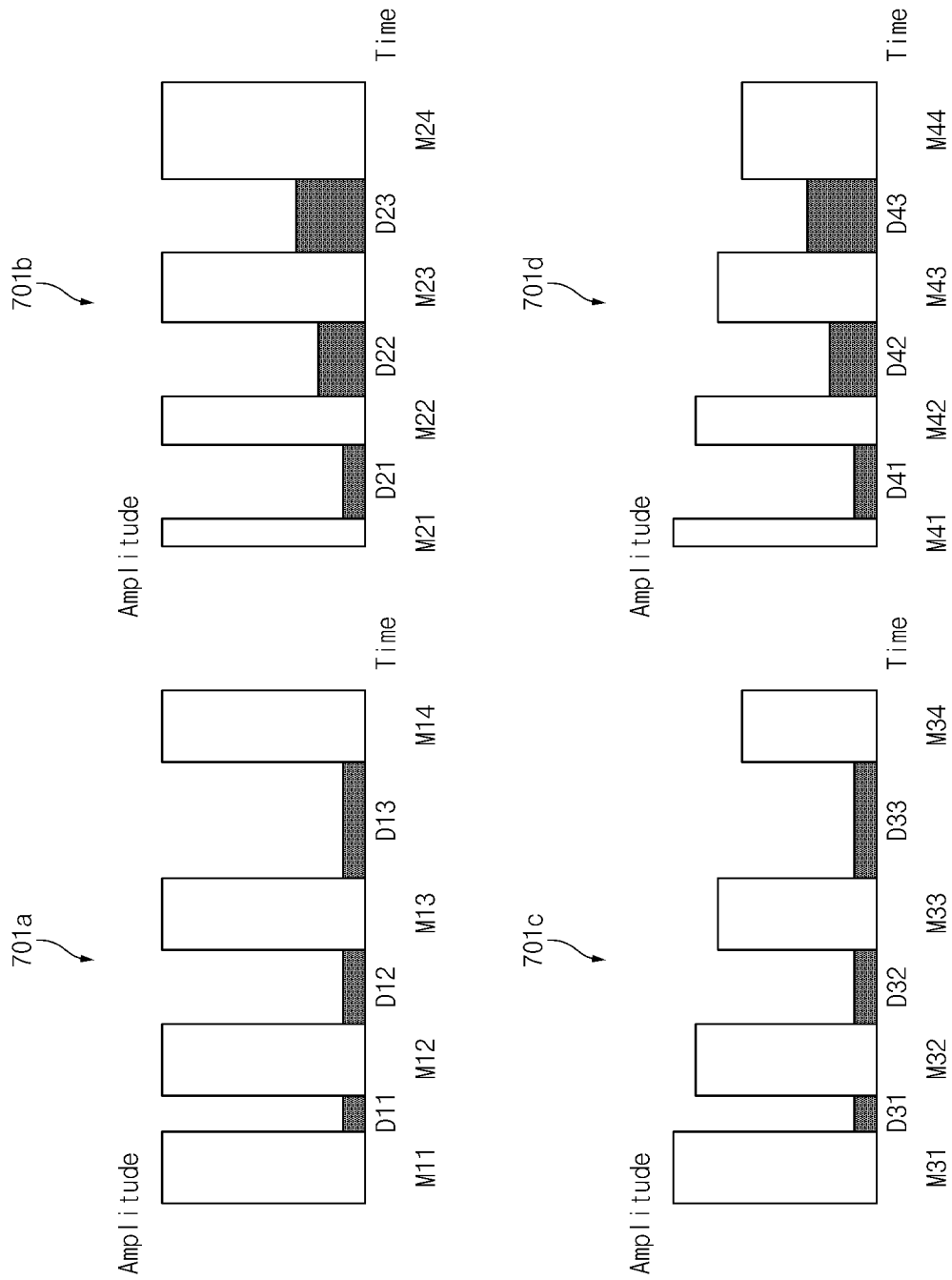
FIG. 7 illustrates a liquid discharge sound including a dummy tone, in a time domain, according to various embodiments.

FIG. 7 illustrates a liquid discharge sound including a dummy tone, in a time domain, according to various embodiments.

Referring to FIG. 7, the processor 120 may output liquid discharge sounds 701a, 701b, 701c, and 701d, through the sound output device 155 (e.g., the speaker or the receiver). The sound output device 155 may generate vibration corresponding to each of the liquid discharge sounds 701a, 701b, 701c, and 701d. A liquid (e.g., moisture) introduced into a sound output space may be discharged to the outside by the vibration.

The liquid discharge sounds 701a, 701b, 701c, and 701d may include a plurality of multi-frequency signals. The liquid discharge sounds 701a, 701b, 701c, and 701d are provided for the illustrative purpose, but the disclosure is not limited thereto.

The liquid discharge sounds 701a, 701b, 701c, and 701d may include dummy tones between a plurality of multi-frequency signals. The dummy tone may prevent sound separation during the reproduction of the liquid discharge sounds 701a, 701b, 701c, or 701d, such that a user hears a continuous sound.

According to various embodiments, the liquid discharge sound 701a may include the first multi-frequency signal M11 to the fourth multi-frequency signal M14. The first multi-frequency signal M11 to the fourth multi-frequency signal M14 may have equal sound pressures. The first multi-frequency signal M11 to the fourth multi-frequency signal M14 may have equal durations The time intervals among the first multi-frequency signal M11 to the fourth multi-frequency signal M14 may be set to mutually different values. The liquid discharge sound 701a may include dummy tones D11, D12, and D13 among the first to fourth multi-frequency signals M11 to M14. According to an embodiment, the dummy tones D11, D12, and D13 may have sound pressures, which are equal to each other and lower than sound pressures of the first multi-frequency signal M11 to the fourth multi-frequency signal M14.

According to various embodiments, the liquid discharge sound 701b may include the first multi-frequency signal M21 to the fourth multi-frequency signal M24. The first multi-frequency signal M21 to the fourth multi-frequency signal M24 may have equal sound pressures. The first multi-frequency signal M21 to the fourth multi-frequency signal M24 may have mutually different durations.

The time intervals among the first multi-frequency signal M21 to the fourth multi-frequency signal M24 may be set to equal values. The liquid discharge sound 701b may include dummy tones D21, D22, and D23 among the first to fourth multi-frequency signals M21 to M24. According to an embodiment, the sound pressures of the dummy tones D21, D22, and D23 may be gradually increased over time (the sound pressure of the dummy tone D21<the sound pressure of the dummy tone D22<the sound pressure of the dummy tone D23).

According to various embodiments, the liquid discharge sound 701c may include the first multi-frequency signal M31 to the fourth multi-frequency signal M34. The first multi-frequency signal M31 to the fourth multi-frequency signal M34 may have mutually different sound pressures. For example, the sound pressures of the first multi-frequency signal M31 to the fourth multi-frequency signal M34 may be gradually decreased over time. The first multi-frequency signal M31 to the fourth multi-frequency signal M34 may have equal durations The time intervals among the first multi-frequency signal M31 to the fourth multi-frequency signal M34 may be set to mutually different values. The liquid discharge sound 701c may include dummy tones D31, D32, and D33 among the first to fourth multi-frequency signals M31 to M34. According to an embodiment, the dummy tones D31, D32, and D33 may have sound pressures, which are equal to each other and lower than sound pressures of the first multi-frequency signal M31 to the fourth multi-frequency signal M34.

According to various embodiments, the liquid discharge sound 701d may include the first multi-frequency signal M41 to the fourth multi-frequency signal M44. The first multi-frequency signal M41 to the fourth multi-frequency signal M44 may have mutually different sound pressures. For example, the sound pressures of the first multi-frequency signal M41 to the fourth multi-frequency signal M44 may be gradually decreased over time. The first multi-frequency signal M241 to the fourth multi-frequency signal M244 may have mutually different durations.

The time intervals among the first multi-frequency signal M41 to the fourth multi-frequency signal M44 may be set to equal values. The liquid discharge sound 701d may include dummy tones D41, D42, and D43 among the first to fourth multi-frequency signals M41 to M44. According to an embodiment, the sound pressures of the dummy tones D41, D42, and D43 may be gradually increased over time (the sound pressure of the dummy tone D41<the sound pressure of the dummy tone D42<the sound pressure of the dummy tone D43).

According to various embodiments, the dummy tone may have energy constant depending on the duration and the sound pressure. For example, when the sound pressure of the dummy tone has a stronger intensity, the duration of the dummy tone may be set to be shorter. For another example, when the sound pressure of the dummy tone has a weaker intensity, the duration of the dummy tone may be set to be longer.

According to an embodiment, dummy tones may be set to have the same specified frequencies. For example, even if a liquid discharge sound is changed, the dummy tones may be set to have the same specified frequencies.

The form of the dummy tone illustrated in FIG. 7 is provided for the illustrative purpose, but the disclosure is not limit thereto. For example, the dummy tone may be set to have a sound pressure having an intermediate value of a sound pressure of a previous multi-frequency signal and a sound pressure of a next multi-frequency signal.

Figure 8A:
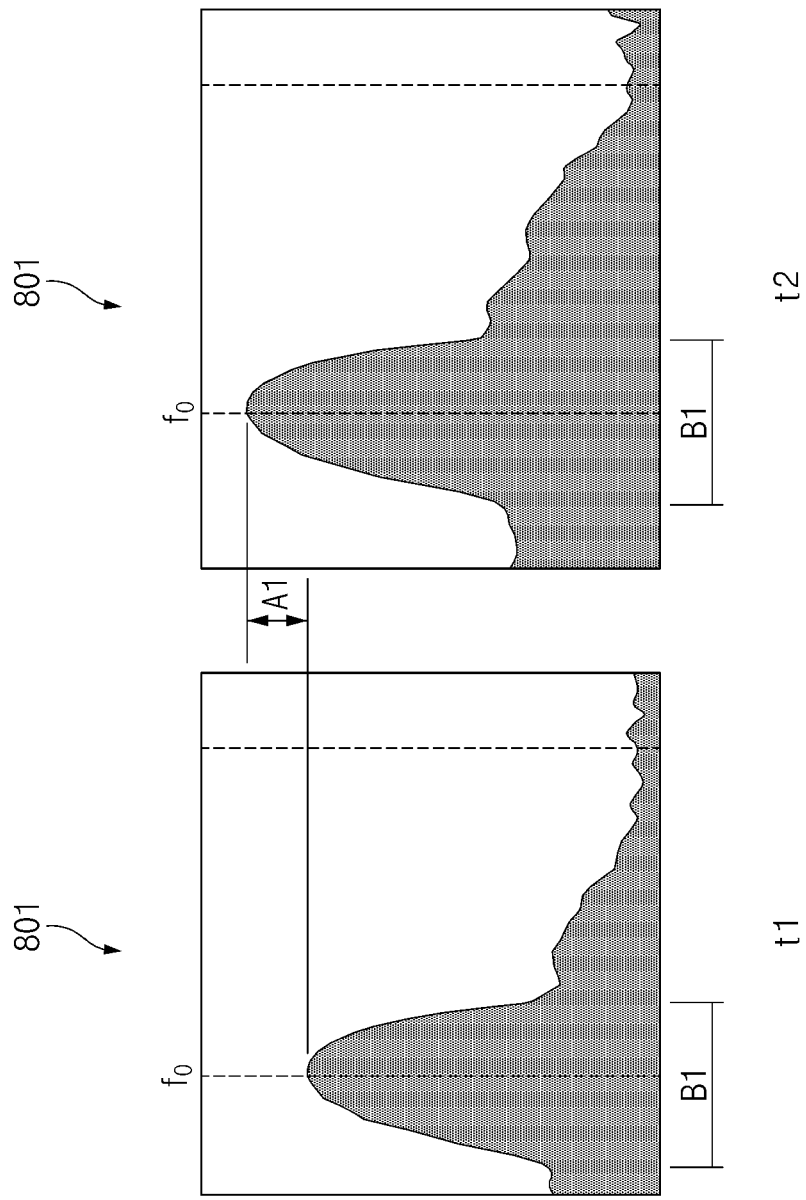
FIGS. 8A and 8B are waveforms illustrating the change of a sound pressure of a frequency band, according to various embodiments.
Figure 8B:
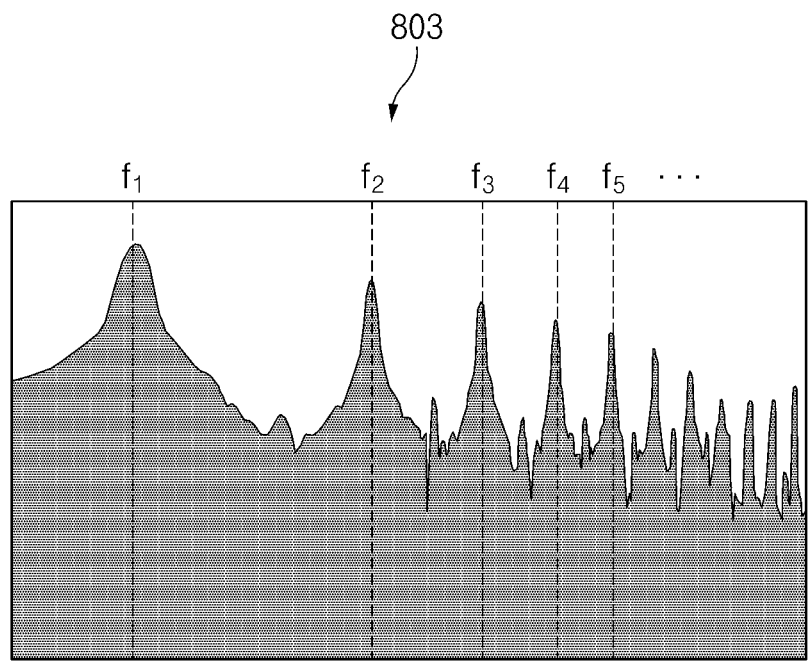

FIGS. 8A and 8B are waveforms illustrating the change of a sound pressure of a frequency band, according to various embodiments. Although FIG. 8A illustrates one frequency band, the disclosure is not limited thereto.

Referring to FIG. 8A, a liquid discharge sound 801 may include a frequency band B1 having a center frequency $f_0$ for time t1. The sound pressure of a frequency signal included in the frequency band B1 may be changed over time, in the state that the center frequency $f_0$ is maintained.

For example, for time t2, the whole sound pressure of a frequency signal included in the frequency band B1 may be increased in the state that the center frequency $f_0$ is maintained in the liquid discharge sound 801. The sound pressure of the center frequency for time t2 may be increased by 'A1' from the sound pressure of the center frequency $f_0$ for time t1.

Referring to FIG. 8B, a liquid discharge sound 803 may include a plurality of frequency bands. The plurality of frequency bands may have center frequencies (e.g., $f_1$, $f_2$, $f_3$, $f_4$, and, $f_5$). The center frequency (e.g., $f_1$, $f_2$, $f_3$, $f_4$, and, $f_5$) may be a frequency at a point at which the highest sound pressure is shown in each of the plurality of frequency bands.

The sound pressure of a frequency signal included in the plurality of frequency bands may be changed in the state that the center frequencies (e.g., $f_1$, $f_2$, $f_3$, $f_4$, and, $f_5$) are maintained.

Figure 9:
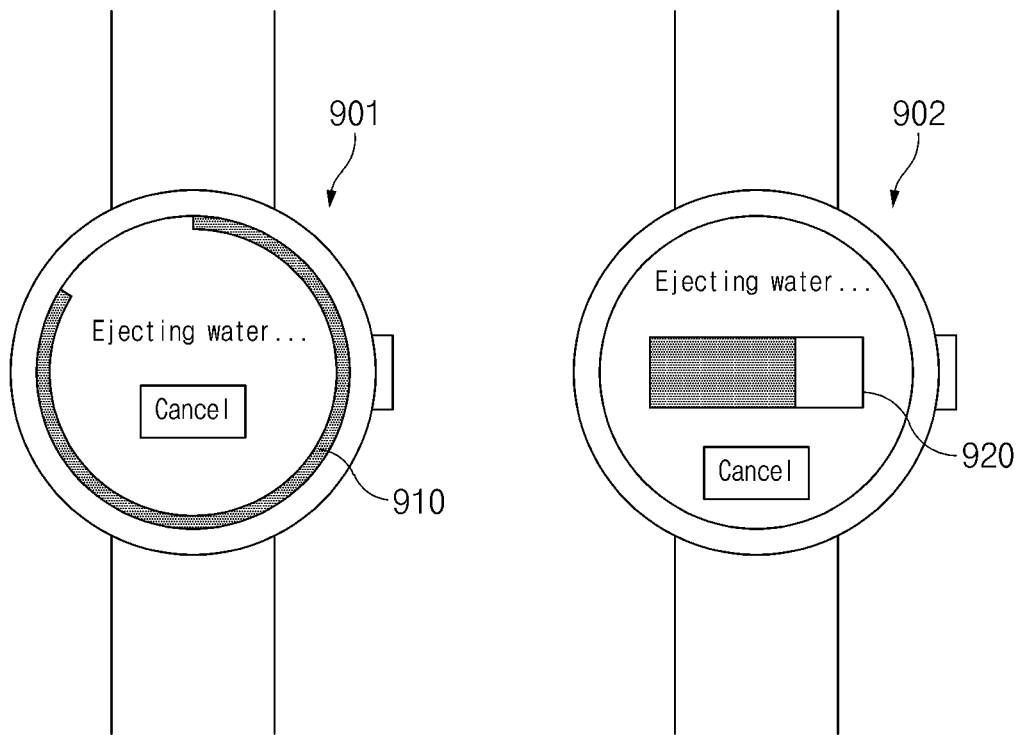
FIG. 9 is a user interface for discharging a liquid, according to various embodiments.

FIG. 9 is a user interface for discharging a liquid, according to various embodiments. FIG. 9 is provided for the illustrative purpose, but the disclosure is not limited thereto.

Referring to FIG. 9, a liquid (e.g., moisture) may be introduced from the outside through the acoustic conduit 115a, which is to output a sound of an electronic device, depending on the use environment (e.g., swimming or fishing) of a user. In this case, the liquid (e.g., moisture) may be collected in a sound output space. The processor 120 may discharge the liquid (e.g., moisture) out of the sound output space, by outputting a liquid discharge sound having a center frequency, which is not changed over time, and a sound pressure changed over time. The processor 120 may automatically output the liquid discharge sound, when the display device 160 (e.g., display) is released from a water-lock mode.

According to various embodiments, the processor 120 may display a user interface on the display while the liquid discharge sound is output, such that the user identifies a progressing situation.

For example, in a first user interface 901, the processor 120 may display a circular graph 910 to allow the user to identify a process of discharging the liquid. For example, in a second user interface 902, the processor 120 may display a bar graph 920 to allow the user to identify a process of discharging the liquid.

According to an embodiment, when the user presses a stop button or another physical button, the processor 120 may stop a process of discharging the liquid. The processor 120 may display a pop-up window on the display to determine whether to additionally output the liquid discharge sound, after one process of discharging a liquid is completed.

According to various embodiments, the processor 120 may change a manner for outputting the liquid discharge sound, corresponding to a specified user input. For example, the processor 120 may perform operations, such as starting/ pausing/sound pressure changing/time interval changing/ duration changing/sound changing, for the liquid discharge sound, corresponding to a gesture input (e.g., tapping a screen, zooming-in, zooming-out, or sweeping) made on the display, or an input (e.g., wheel rotating, or crown rotating) using a physical button.

According to an embodiment, the processor 120 may enhance liquid discharge performance by generating vibration in the electronic device 100, by operating a vibration unit during the output of the liquid discharge sound.

Figure 10:
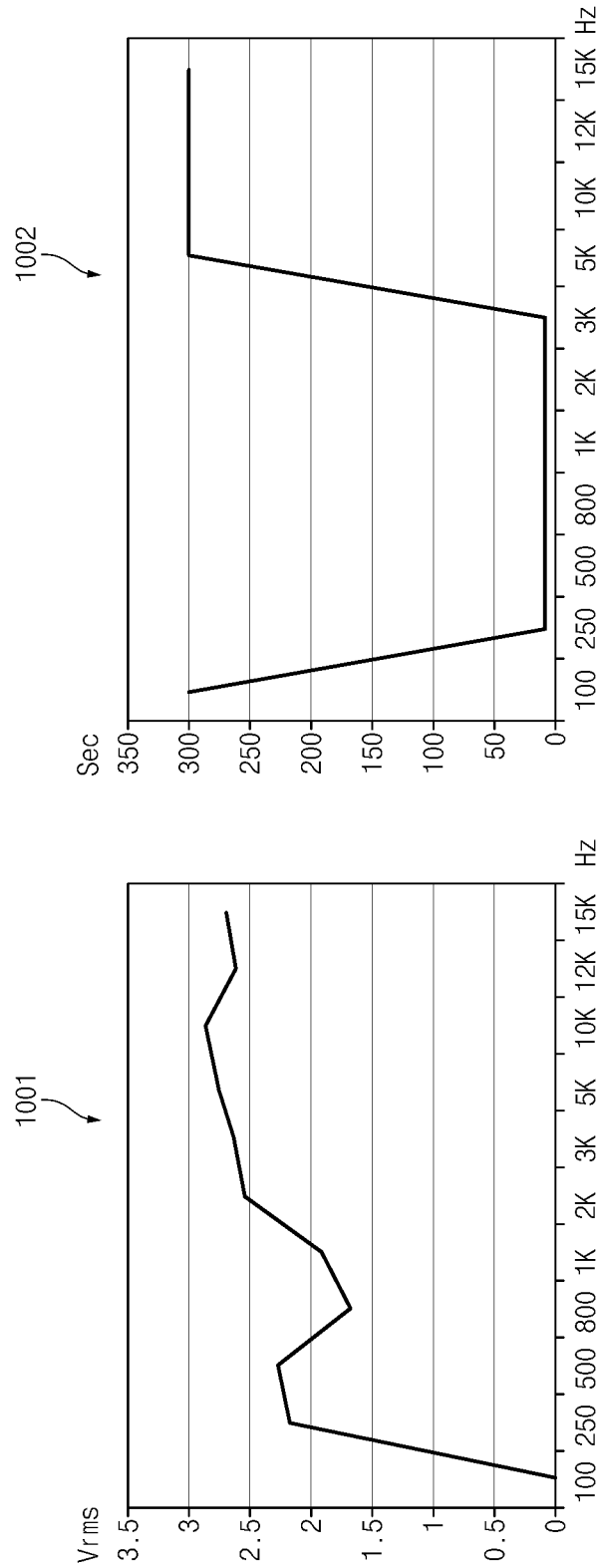
FIG. 10 is a graph illustrating a stress rate and liquid discharge performance of a sound output device depending on a frequency, according to various embodiments.

FIG. 10 is a graph illustrating a stress rate and liquid discharge performance of a sound output device depending on a frequency, according to various embodiments. FIG. 10 is provided for the illustrative purpose, but the disclosure is not limited thereto.

Referring to FIG. 10, a first graph 1001 shows a stress rate of the sound output device 155 (e.g., a speaker or receiver) depending on a frequency. The stress rate may be the level (Vrms) of a voltage used in the process in which the sound output device 155 outputs the liquid discharge sound. When frequency signals representing the same sound volume are reproduced, the stress rate of the sound output device 155 may be varied for each frequency.

A second graph 1002 shows liquid discharge performance (e.g., time taken until a liquid is discharged after introduced) depending on frequencies, when the maximum voltage is applied to the sound output device (e.g., speaker or receiver). When the maximum voltage of the speaker is generated for each frequency, the liquid discharge performance may be varied depending on the frequencies. For example, when the frequency signal has the frequency between about 250 hz to 3 khz, the effect of discharging the liquid may be increased.

According to various embodiments, the processor 120 may determine a center frequency which is not changed over time, based the stress rate and the liquid discharge performance depending on the frequency in the sound output device (e.g., the speaker or the receiver). For example, the center frequency may be set to about 800 hz, which shows a lower stress rate, in the frequency band (e.g., 250 hz to 3 khz) showing relatively excellent liquid discharge performance.

Figure 11:
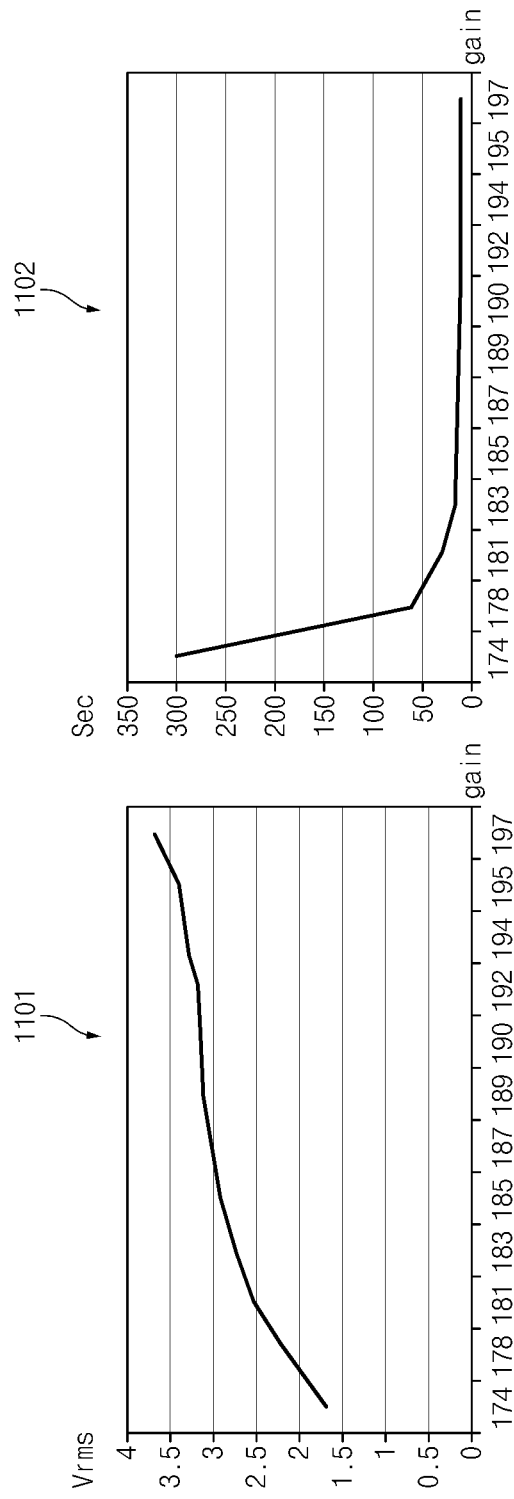
FIG. 11 is a graph illustrating a stress rate and liquid discharge performance of a sound output device depending on the variation of an audio gain, according to various embodiments.

FIG. 11 is a graph illustrating a stress rate and liquid discharge performance of a sound output device depending on the variation of an audio gain, according to various embodiments.

Referring to FIG. 11, a first graph 1101 shows a stress rate of the sound output device (e.g., a speaker or receiver) depending on the increase of an audio gain. The first graph 1101 is a graph for the increase in the stress rate of the speaker. The stress rate may be the level (Vrms) of a voltage used in the process in which the sound output device 155 outputs the liquid discharge sound. The processor 120 may increase a sound pressure by amplifying a gain in an audio circuit or may increase the sound pressure of a frequency in the source of the liquid discharge sound.

A second graph 1102 shows the liquid discharge performance (e.g., time taken until a liquid is discharged after introduced) depending on the increase in audio gain. The liquid may be discharged within reference time (e.g., 15 seconds), after a specified gain.

According to various embodiments, the processor 120 may set the audio gain, and the sound pressure of the liquid discharge sound, based on the stress rate and liquid discharge performance depending on the increase in and the audio gain of the sound output device (e.g., speaker or receiver). For example, the processor 120 may set the audio gain to 183 representing the lowest stress rate, in the state that the liquid is able to be discharged within 15 seconds. The processor 120 may additionally change the sound pressure of the frequency in the source of the liquid discharge sound.

Figure 12:
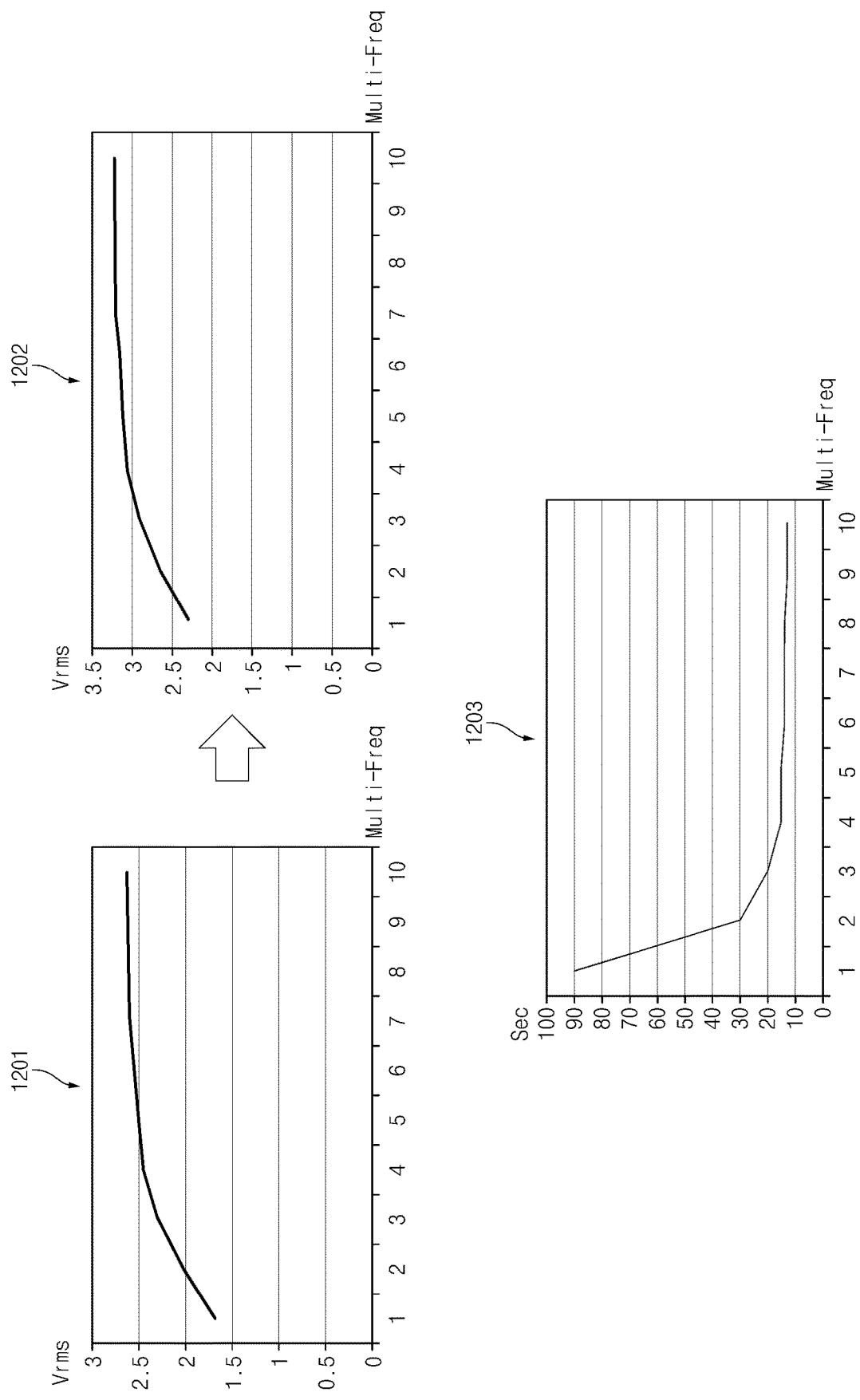
FIG. 12 illustrates a stress rate and liquid discharge performance depending on the number of center frequencies of a liquid discharge sound, according to various embodiments.

FIG. 12 illustrates a stress rate and liquid discharge performance, depending on the number of center frequencies of a liquid discharge sound, according to various embodiments.

Referring to FIG. 12, a first graph 1201 shows a stress rate of the sound output device (e.g., a speaker or receiver) depending on the number of center frequencies included in the liquid discharge sound. As the number of the center frequencies is increased, the stress rate may be increased. According to various embodiments, the sound output device may be tuned to correspond to the rated voltage of the sound output device (e.g., the speaker or the receiver), as shown in a second graph 1202.

A third graph 1203 shows liquid discharge performance (e.g., time taken until a liquid is discharged after introduced) depending on the number of center frequencies after tuning of the sound output device (e.g., a speaker or a phone receiver).

The processor 120 may set the number of center frequencies (e.g., 5 center frequencies) to allow a liquid to be discharged within a reference time (e.g., 15 seconds), while reducing the stress rate of the sound output device (e.g., speaker or receiver).

Figure 13A:
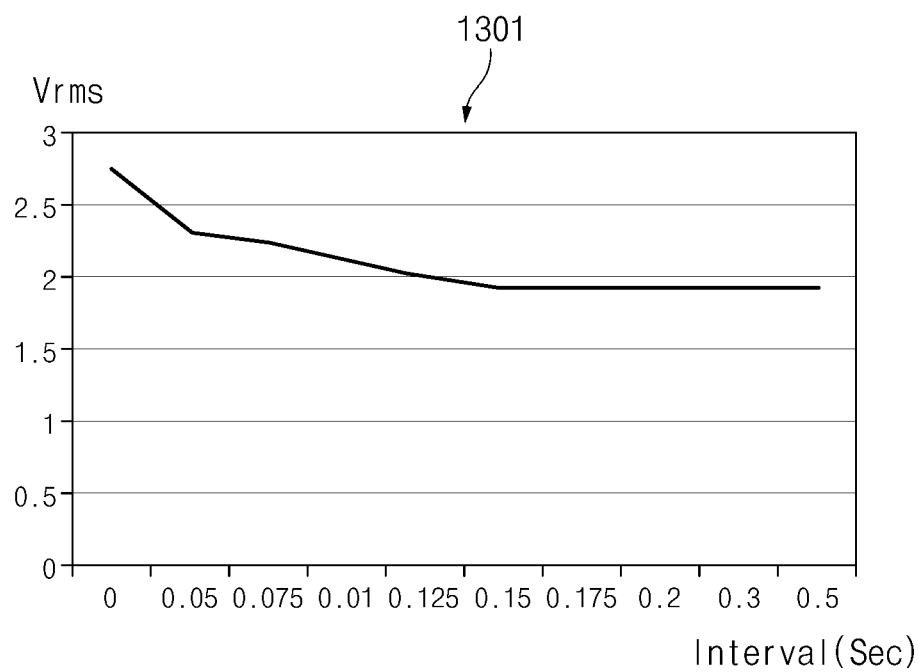
FIG. 13A is a graph illustrating that an interval is adjusted, according to various embodiments.
Figure 13A:
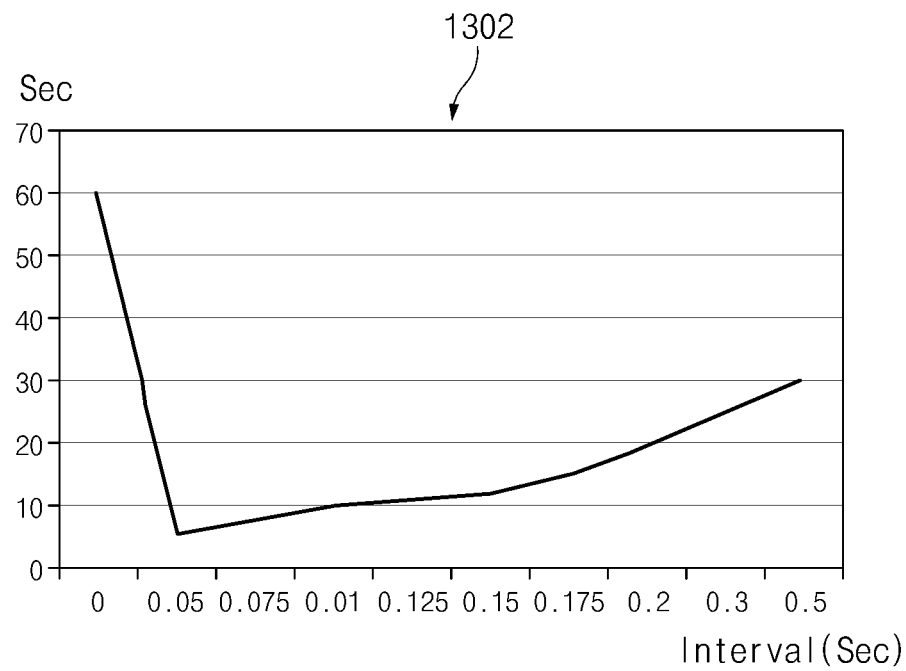

FIG. 13A is a graph illustrating that an interval is adjusted, according to various embodiments.

Referring to FIG. 13A, a first graph 1301 shows a stress rate of the sound output device (e.g., a speaker or receiver) depending on the time interval between multi-frequency signals. A second graph 1302 shows liquid discharge performance depending on the time interval between multi-frequency signals. For example, when the time interval between the multi-frequency signals is equal to or less than a reference value (e.g., 0.05 seconds), the liquid discharge performance may be rapidly decreased. As the time interval between the multi-frequency signals is increased, the liquid discharge performance may be gradually decreased.

The processor 120 may determine a time interval showing the excellent liquid discharge performance while reducing the stress rate, by adjusting the time interval between the multi-frequency signals. For example, the processor 120 may set, to 0.128 seconds, the time interval between multi-frequency signals such that the liquid discharge performance is maintained while reducing the stress rate.

Figure 13B:
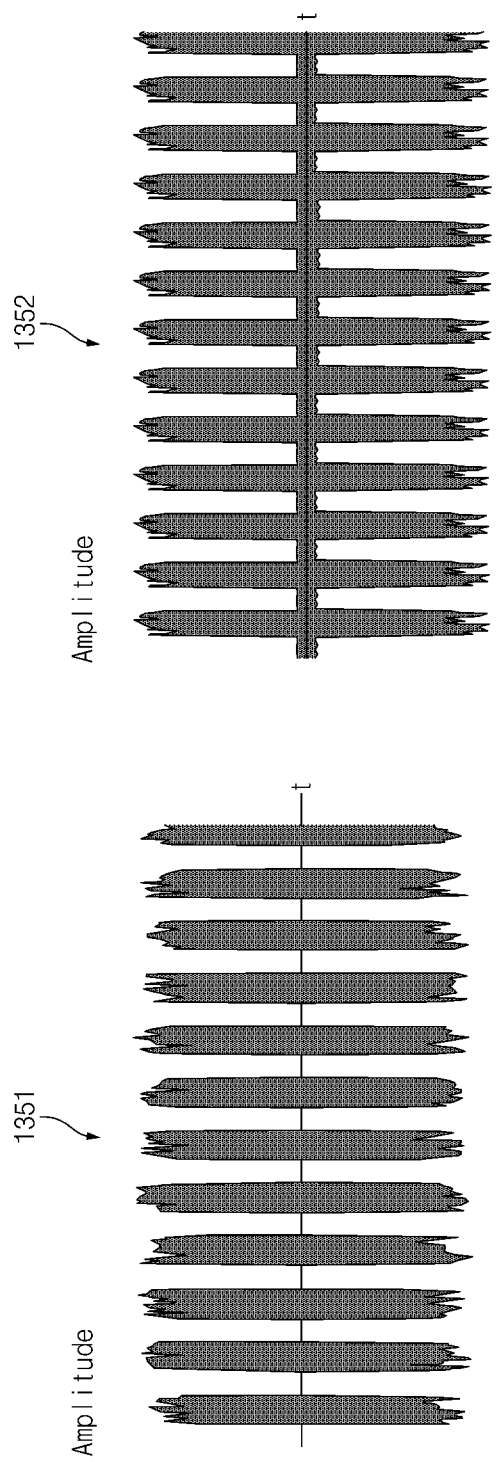
FIG. 13B is a graph illustrating continuity of a sound in a time domain, according to various embodiments.

FIG. 13B is a graph illustrating continuity of a sound in a time domain, according to various embodiments.

Referring to FIG. 13B, a first graph 1351 shows a liquid discharge sound that makes the sound pressure, which becomes zero, without inserting a dummy tone between multi-frequency signals. In this case, voltage sparks may intermittently occur due to on/off switching noise of the voltage within a short time.

A second graph 1352 shows a liquid discharge sound to maintain the continuity of a sound by inserting a dummy tone between multi-frequency signals. The dummy tone may have a sound pressure lower than that of the multi-frequency signal. The dummy tone may reduce the on/off switching noise of the voltage, and may prevent a user from hearing a sound which is intermittently disconnected.

Figure 14:
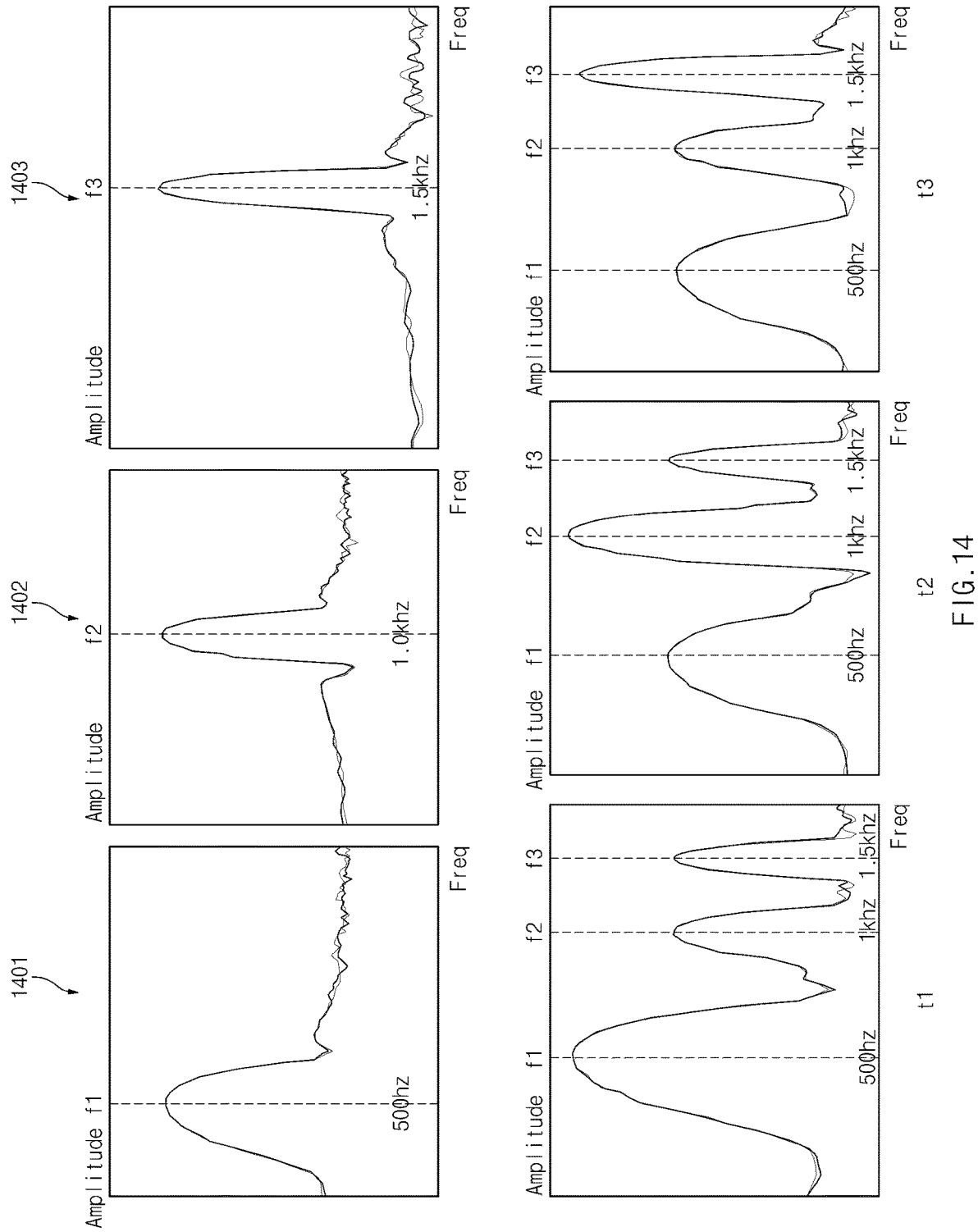
FIG. 14 is a view illustrating that sound pressures of multiple frequencies are changed, according to various embodiments.

FIG. 14 is a view illustrating that sound pressures of multiple frequencies are changed, according to various embodiments.

Referring to FIG. 14, the processor 120 may output a liquid discharge sound, through the sound output device 155 (e.g., the speaker or the receiver). The liquid discharge sound may include a plurality of frequency bands. For example, the plurality of frequency bands may include a first frequency band 1401, a second frequency band 1402, and a third frequency band 1403. The first frequency band 1401 may have a first center frequency f1 (e.g., 500 hz). The second frequency band 1402 may have a second center frequency f2 (e.g., 1 khz). The third frequency band 1403 may have a third center frequency f3 (e.g., 1.5 khz).

The sound pressures of the first to third frequency bands 1401 to 1403 may be changed over time. For example, the sound pressure of the first center frequency f1 in the first frequency band 1401 may be higher than the sound pressure of the center frequency in other frequency bands, for time t1. For example, the sound pressure of the second center frequency f2 in the second frequency band 1402 may be higher than the sound pressure of the center frequency in other frequency bands, for time t2. For example, the sound pressure of the third center frequency f3 in the third frequency band 1403 may be higher than the sound pressure of the center frequency in other frequency bands, for time t3.

Figure 15:
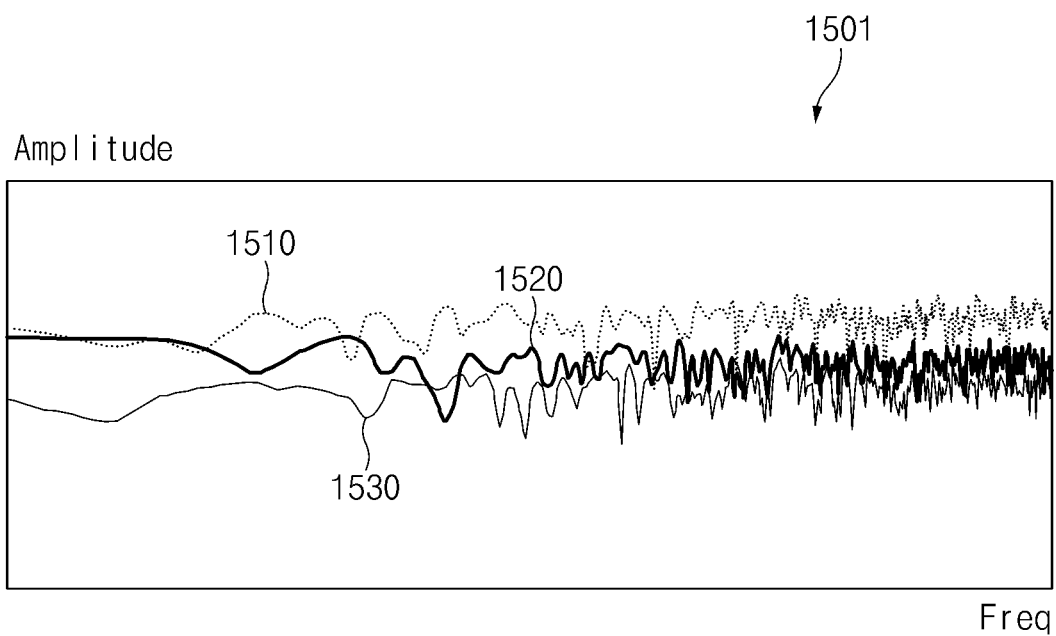
FIG. 15 illustrates a liquid discharge sound using a continuous frequency signal, according to various embodiments.

FIG. 15 illustrates a liquid discharge sound using a continuous frequency signal, according to various embodiments.

Referring to FIG. 15, liquid discharge sounds 1510, 1520, and 1530 may include all frequencies in a specified frequency band (e.g., 1-20 khz).

According to an embodiment, the processor 120 may change the sound pressures of frequencies constituting the liquid discharging sounds 1510, 1520, and 1530 over time. For example, the first frequency signal 1510 may be output, for first time. The second frequency signal 1520, which is different from the first frequency signal 1510 in terms of a sound pressure of each frequency, may be output, for second time. The third frequency signal 1530, which is different from the first frequency signal 1510 or the second frequency signal 1520 in terms of a sound pressure of each frequency, may be output, for third time.

According to various embodiments, an electronic device includes a housing, a sound output device disposed at least partially in the housing including an acoustic conduit to output a sound, and connected with an outside of the electronic device through the acoustic conduit, a memory, and a processor electrically connected with the sound output device and the memory. The processor may determine whether specified information is received in association with an output of the sound output device, output, through the sound output device, a sound including a plurality of frequency bands, based on the specified information, when the specified information is received, and maintain center frequencies of the plurality of frequency bands to be substantially fixed and change, in a specified range, sound pressures of the plurality of frequency bands, during time that the sound is output.

According to various embodiments, the center frequencies may be frequencies at points showing substantially highest sound pressures in the plurality of frequency bands, respectively.

According to various embodiments, the electronic device may further include a sensing module to sense that a foreign matter, which is introduced from the outside of the electronic device, is present in the acoustic conduit. The processor may receive the specified signal, based on the foreign matter introduced, and output the sound through the sound output device, based on the specified signal.

According to various embodiments, the processor may output the plurality of frequency bands at a first sound pressure, for first time, output the plurality of frequency bands at a second sound pressure, for second time after the first time, and output the plurality of frequency bands at a third sound pressure, for third time after the second time.

According to various embodiments, the processor may output a dummy tone having sound pressure lower than the plurality of frequency bands, between the first time and the second time. The processor may determine a time interval, which is between the first time and the second time, to be different from a time interval between the second time and the third time. The processor may determine output bands of the plurality of frequency bands, based on at least one of an intensity of a voltage used in the sound output device or a gain of an audio circuit to generate the sound.

According to various embodiments, the electronic device may further include a display to receive a touch input. The processor may output the sound through the sound output device, when restriction of a touch to the display is released.

According to various embodiments, the processor may display a user interface associated with outputting the sound, by using the display. According to various embodiments, the processor may display a user interface for selecting the sound of a plurality of specified sounds, when the restriction of the touch to the display is released.

According to various embodiments, the processor may determine to discharge the foreign matter through the acoustic conduit, and terminate outputting the sound.

According to various embodiments, the electronic device may further include a vibration unit to generate vibration in the electronic device, and the processor may drive the vibration unit while outputting the sound.

According to various embodiments, the processor may change a manner for outputting the plurality of frequency bands, when a specified user input is received. The processor may repeatedly output the sound, in a specified period of time.

Each of components (e.g., a module or a program) may include a single entity or a plurality of entities; some of the above-described corresponding sub components may be omitted, or any other sub component may be further included in various embodiments. Alternatively additionally, some components (e.g., a module or a program) may be combined with each other so as to form one entity, so that the functions of the components may be performed in the same manner as before the combination. According to various embodiments, operations executed by modules, program modules, or other components may be executed by a successive method, a parallel method, a repeated method, or a heuristic method. Alternatively, at least some of the operations may be executed in another order or may be omitted, or any other operation may be added.

The invention claimed is:

1. An electronic device comprising:
   a housing including an acoustic conduit to output a sound;
   a sound output device disposed at least partially in the housing, and connected with an outside of the electronic device through the acoustic conduit;
   a memory;
   a sensing module configured to sense that a foreign matter is present in the acoustic conduit; and
   a processor electrically connected with the sound output device and the memory,
   wherein the processor is configured to:
   receive sensing information indicating that a foreign matter is present in the acoustic conduit from the sensing module;
   determine a plurality of frequency bands based on at least one of an intensity of a voltage used in the sound output device and a gain of an audio circuit of the sound output device;
   output, through the sound output device, a liquid discharge sound including the plurality of frequency bands, which are separated from each other in a frequency domain, in response to the sensing information is received; and
   maintain center frequencies of the plurality of frequency bands to be substantially fixed and change, within a specified range, sound pressures of the plurality of frequency bands, during the time that the liquid discharge sound is output.

2. The electronic device of claim 1, wherein the center frequencies are frequencies at points showing substantially highest sound pressures in the plurality of frequency bands, respectively.

3. The electronic device of claim 1, wherein changing, within the specified range, sound pressures of the plurality of frequency bands during the time that the liquid discharge sound is output comprises:
   from a first period of time during which the sound is output to a second period of time, after the first period of time, during which the sound is output, changing the sound pressure for at least one of the plurality of frequency bands;
   from the second period of time to a third period of time, after the second period of time, during which the sound is output, changing the sound pressure for at least one other one of the plurality of frequency bands.

4. The electronic device of claim 3, wherein the first period of time and the second period of time are separated by a first time interval and the second period of time and the third period of time are separated by a second time interval.

5. The electronic device of claim 4, wherein the processor is configured to:
   output a dummy tone having a sound pressure lower than the plurality of frequency bands, during the first time interval and the second time interval.

6. The electronic device of claim 4, wherein the first time interval is different from the second time interval.

7. The electronic device of claim 1, further comprising:
   a display configured to receive a touch input,
   wherein the processor is configured to:
   output the sound through the sound output device, when a water-lock-mode is released.

8. The electronic device of claim 7, wherein the processor is configured to:
   display a user interface associated with outputting the sound, by using the display.

9. The electronic device of claim 7, wherein the processor is configured to:

display a user interface for selecting the sound from a plurality of specified sounds, when the water-lock-mode is released.

10. The electronic device of claim 1, wherein the processor is configured to:
   Determine that the foreign matter has been discharged through the acoustic conduit; and,
   terminate outputting the sound.

11. The electronic device of claim 7, further comprising:
   a vibration unit configured to generate vibration in the electronic device,
   wherein the processor is configured to:
   drive the vibration unit while outputting the sound.

12. The electronic device of claim 1, wherein the processor is configured to:
   change a manner for outputting the plurality of frequency bands, when a specified user input is received.

13. The electronic device of claim 1, wherein the processor is configured to:
   repeatedly output the sound, in a specified period of time.

14. A method for outputting a sound in an electronic device, the method comprising:
   determining whether foreign matter is present in an acoustic conduit included in a housing of the device, based on sensing information sensed by a sensing module of the device;
   determining a plurality of frequency bands based on at least one of an intensity of a voltage used in the sound output device and a gain of an audio circuit of the sound output device;
   outputting, through a sound output device of the electronic device, a liquid discharge sound including the plurality of frequency bands, which are separated from each other in a frequency domain, in response to a determination that foreign matter is present in the acoustic conduit;
   and
   maintaining center frequencies of the plurality of frequency bands to be substantially fixed and changing, within a specified range, sound pressures of the plurality of frequency bands, during the time that the liquid discharge sound is output.

* * * * *